(12) United States Patent
Austin et al.

(10) Patent No.: US 9,807,250 B2
(45) Date of Patent: Oct. 31, 2017

(54) WI-FI INTELLIGENT SELECTION ENGINE

(71) Applicant: AT&T Mobility II LLC, Atlanta, GA (US)

(72) Inventors: Mark David Austin, Roswell, GA (US); Kurt Huber, Kennesaw, GA (US); Sheldon Kent Meredith, Marietta, GA (US); Michael A. Salmon, Loganville, GA (US); Rick Tipton, Corryton, TN (US)

(73) Assignee: AT&T MOBILITY II LLC, Atlanta, GA (US)

(*) Notice: Subject to any disclaimer, the term of this patent is extended or adjusted under 35 U.S.C. 154(b) by 0 days.

(21) Appl. No.: 14/040,428

(22) Filed: Sep. 27, 2013

(65) Prior Publication Data

US 2014/0105003 A1   Apr. 17, 2014

Related U.S. Application Data

(63) Continuation of application No. 12/883,145, filed on Sep. 15, 2010, now Pat. No. 8,570,993.
(Continued)

(51) Int. Cl.
*H04W 4/02* (2009.01)
*H04M 15/00* (2006.01)
(Continued)

(52) U.S. Cl.
CPC ... *H04M 15/8271* (2013.01); *H04M 3/42017* (2013.01); *H04W 4/02* (2013.01);
(Continued)

(58) Field of Classification Search
None
See application file for complete search history.

(56) References Cited

U.S. PATENT DOCUMENTS 4,718,081 A    1/1988 Brenig
5,799,256 A    8/1998 Pombo et al.
(Continued)

FOREIGN PATENT DOCUMENTS

CN    101841601 A    9/2010
CN    104881839 A    9/2015
(Continued)

OTHER PUBLICATIONS

Japanese Office Action dated Apr. 3, 2014 for Japanese Patent Application No. 2013-511386, 6 pages.
(Continued)

*Primary Examiner* — Rina Pancholi
(74) *Attorney, Agent, or Firm* — Amin, Turocy & Watson, LLP

(57) ABSTRACT

Devices, systems, and methods are disclosed to offload the usage of a cellular network by intelligent selection of broadband network connections such as Wi-Fi access points. A Wi-Fi transceiver on a mobile device is activated when certain conditions are met, such as a time, location, recognition of a radiofrequency (RF) environment, etc. The conditions are correlated with a database of known locations in which a one or more Wi-Fi access points are determined to exist. The Wi-Fi transceiver on the mobile device is activated and commanded to connect to a particular Wi-Fi access point. Dynamic intelligence ensures that the appropriate connection method is used, and minimizes handovers to networks or access points that are unreliable or that are predicted to become inaccessible to the mobile device.

20 Claims, 27 Drawing Sheets

Related U.S. Application Data

(60) Provisional application No. 61/346,897, filed on May 20, 2010.

(51) Int. Cl.

| | | |
|---|---|---|
| *H04W 88/06* | (2009.01) | |
| *H04W 28/08* | (2009.01) | |
| *H04M 3/42* | (2006.01) | |
| *H04W 4/24* | (2009.01) | |
| *H04W 72/04* | (2009.01) | |

(52) U.S. Cl.
CPC ............ *H04W 4/24* (2013.01); *H04W 28/08* (2013.01); *H04W 72/0413* (2013.01); *H04W 88/06* (2013.01)

(56) References Cited

U.S. PATENT DOCUMENTS

| | | | |
|---|---|---|---|
| 6,556,822 B1 | 4/2003 | Matsumoto | |
| 6,813,501 B2 | 11/2004 | Kinnunen et al. | |
| 7,400,604 B2 | 7/2008 | Lee | |
| 7,466,986 B2 | 12/2008 | Halcrow et al. | |
| 7,532,898 B2 | 5/2009 | Halcrow et al. | |
| 7,738,884 B2 | 6/2010 | Cheung et al. | |
| 7,945,271 B1 | 5/2011 | Barnes et al. | |
| 8,320,285 B2 | 11/2012 | Kitani | |
| 8,364,155 B1 | 1/2013 | Ahmed et al. | |
| 8,593,952 B2 | 11/2013 | Puthenpura et al. | |
| 9,059,802 B2 | 6/2015 | Tipton et al. | |
| 9,258,770 B2 | 2/2016 | Wuellner et al. | |
| 2003/0008668 A1 | 1/2003 | Perez-Breva et al. | |
| 2004/0052231 A1 | 3/2004 | Ramaswamy et al. | |
| 2004/0090943 A1 | 5/2004 | Da Costa et al. | |
| 2005/0020278 A1 | 1/2005 | Krumm et al. | |
| 2005/0048986 A1 | 3/2005 | Zhao | |
| 2006/0030350 A1* | 2/2006 | Mitchell | H04W 52/146 455/522 |
| 2006/0181413 A1 | 8/2006 | Mostov | |
| 2006/0209882 A1* | 9/2006 | Han et al. | 370/465 |
| 2006/0217147 A1 | 9/2006 | Olvera-Hernandez et al. | |
| 2006/0280226 A1 | 12/2006 | Krasner | |
| 2007/0008925 A1 | 1/2007 | Dravida et al. | |
| 2008/0132239 A1* | 6/2008 | Khetawat et al. | 455/438 |
| 2008/0165680 A1 | 7/2008 | Chang | |
| 2008/0205358 A1 | 8/2008 | Jokela | |
| 2008/0207222 A1 | 8/2008 | Bhattacharya et al. | |
| 2008/0305786 A1* | 12/2008 | Arumi | H04W 52/0274 455/426.1 |
| 2009/0042557 A1 | 2/2009 | Vardi | |
| 2009/0046654 A1* | 2/2009 | Hoshi | H04W 36/0088 370/331 |
| 2009/0111485 A1* | 4/2009 | Kitani | 455/456.1 |
| 2009/0182533 A1 | 7/2009 | Neuenschwander et al. | |
| 2009/0196268 A1 | 8/2009 | Caldwell et al. | |
| 2009/0268654 A1 | 10/2009 | Baglin | |
| 2009/0278705 A1* | 11/2009 | Chhabra | H04W 48/20 340/8.1 |
| 2009/0279520 A1* | 11/2009 | Maki | H04W 12/06 370/338 |
| 2010/0085947 A1* | 4/2010 | Ringland et al. | 370/338 |
| 2010/0110921 A1 | 5/2010 | Famolari | |
| 2010/0255891 A1* | 10/2010 | Conway | H04W 52/0216 455/574 |
| 2011/0153816 A1 | 6/2011 | Lloyd et al. | |
| 2011/0222523 A1* | 9/2011 | Fu | H04W 48/10 370/338 |
| 2012/0149388 A1 | 6/2012 | West et al. | |
| 2012/0286997 A1 | 11/2012 | Lin et al. | |
| 2013/0226857 A1 | 8/2013 | Shim et al. | |
| 2014/0094187 A1 | 4/2014 | LaMarca et al. | |
| 2014/0341198 A1 | 11/2014 | Han | |
| 2014/0348013 A1 | 11/2014 | Terrenoir et al. | |
| 2015/0215941 A1 | 7/2015 | Cook et al. | |
| 2015/0319660 A1 | 11/2015 | Helbert | |
| 2015/0365804 A1 | 12/2015 | Chen et al. | |
| 2016/0021514 A1 | 1/2016 | Marti et al. | |
| 2016/0112150 A1 | 4/2016 | Godefroy et al. | |

FOREIGN PATENT DOCUMENTS

| | | |
|---|---|---|
| JP | 2005537695 A | 12/2005 |
| JP | 2006067103 A | 3/2006 |
| JP | 2008118722 | 5/2008 |
| JP | 2008278313 A | 11/2008 |
| JP | 2008312067 | 12/2008 |
| JP | 2009135708 | 6/2009 |
| JP | 2009152899 | 7/2009 |
| JP | 2009159408 | 7/2009 |
| JP | 2009-246874 A | 10/2009 |
| JP | 2010-114774 A | 5/2010 |
| WO | 2008084621 A1 | 7/2008 |
| WO | 2009137718 A1 | 11/2009 |

OTHER PUBLICATIONS

Derr, et al., "Wireless Indoor Location Estimation Based on Neural Network RSS Signature Recognition (LENSR)". 3rd IEEE Conference on Industrial Electronics and Applications, Jun. 2008, 7 pages.
Takenga, "Received Signal Strength based Fingerprint Positioning in Cellular Networks involving Neural Networks and Tracking Techniques". (2007) 9 pages.
Simonite, "Bringing Cell-Phone Location-Sensing Indoors". Technology review published by MIT, Aug. 31, 2010, 2 pages.
"Point Inside Technologies". © 2011, Piont Inside Inc. http://pointinside.com/products-services/overview/ , Jul. 17, 2011, 3 pages.
Manzuri, et al., "Mobile Positioning using Enhanced Signature Database Method and Error Reduction in Location Grid". 2009 International Conference on Communications and Mobile Computing.
"Radar". Microsoft research. http://research.microsoft.com/en-us/projects/radar/default.aspx , Jul. 17, 2011, 3 pages.
Siddiqi, "Experiments in Monte-Carlo Localization using WiFi Signal Strength", Jul. 20, 2011, 8 pages.
"Determining your location using only wifi signals". http://stackoverflow.com/questions/524351/determining-your-location-using-only-wifi-signals, Jul. 17, 2011, 3 pages.
Zaruba, et al., "Indoor location tracking using RSSI readings from a single Wi-Fi accessed point" Jun. 8, 2006 © Springer Science + Business Media, LLC 2006, 15 pages.
International Search Report for PCT/US2011/037332, published Nov. 24, 2011, 3 pages.
3GPP TS 24.302 V8.1.0 Mar. 2009 Access to 3GPP EPC via non-3GPP access networks, 43 pages.
3GPP TS 25.305 V8.1.0 Dec. 2008 Stage 2 functional specification of User equipment positioning in UTRAN, 79 pages.
Office Action dated Aug. 15, 2012 for U.S. Appl. No. 12/883,145, 40 pages.
Office Action dated Jan. 30, 2013 for U.S. Appl. No. 12/883,145, 25 pages.
Office Action dated Nov. 26, 2013 for U.S. Appl. No. 13/292,736, 49 pages.
Office Action dated Jul. 14, 2014 for U.S. Appl. No. 13/292,736, 15 pages.
Notice of Allowance dated Jan. 27, 2015 for U.S. Appl. No. 13/292,736, 16 pages.
Taheri, et al. "Location fingerprinting on infrastructure 802.11 wireless local area networks (WLANs) using Locus," Local Computer Networks, 2004. 29th Annual IEEE International Conference on , vol., No., pp. 676,683, Nov. 16-18, 2004 doi: 10.1109/LCN.2004.74.
Chinese Office Action dated Jan. 29, 2015 for Chinese Patent Application No. 201180024885.3, 6 pages.
Japanese Office Action, mailed Jan. 29, 2015, for Japanese Patent Application No. 2013-511386, 13 pages.

(56) References Cited

OTHER PUBLICATIONS

Japanese Office Action drafted Aug. 31, 2015, mailed Sep. 3, 2015 for Japanese Patent Application No. 2013-511386, 11 pages (with translation).
Japanese Office Action for Japanese Application No. 2013-511386 mailed Mar. 29, 2016, 16 pages (with translation).
Japanese Office Action for Japanese Application No. 2013-511386 mailed Jul. 26, 2016, 16 pages.
Korean Office Action for Korean Application No. 10-2012-7029896 mailed Sep. 22, 2016, 15 pages.
Office Action dated Mar. 22, 2017 for U.S. Appl. No. 14/696,260, 65 pages.

* cited by examiner

WI-FI INTELLIGENT SELECTION ENGINE

CROSS-REFERENCE TO RELATED APPLICATIONS

This application is a continuation of U.S. patent application Ser. No. 12/883,145, filed on Sep. 15, 2010, entitled "WI-FI INTELLIGENT SELECTION ENGINE", which claims priority to U.S. Provisional Patent Application Ser. No. 61/346,897, filed May 20, 2010, entitled "WI-FI INTELLIGENT SELECTION ENGINE", the contents of which are hereby incorporated by reference herein in their entirety into this disclosure.

BACKGROUND OF THE INVENTION

Field of the Invention

The present invention relates to mobile communication systems. In particular, the present invention relates to intelligent selection of access points to a network by a mobile device having a plurality of transceivers.

Background of the Invention

Mobile devices such as cellular telephones, PDAs, etc. are proliferating like never before. Almost everyone has some sort of mobile device, and some people have multiple devices. Users can access several different networks using a single mobile device, and can access voice, text, and multimedia data from other network entities such as servers and other mobile devices. Further, mobile device complexity is increasing, with more and more advanced and power-efficient processors, display interfaces, and applications to provide a user experience like never before. Such devices include, for instance, the iPhone, iPad, Droid, and other PDAs/netbooks. Consequently, users are using their mobile devices more frequently, and have larger bandwidth requirements for data, email, voice, etc.

This increased usage puts a tremendous strain on the network that provides these services. Even with the advent of 3G and 4G networks that use Internet Protocol (IP) addressing, Session Initiation Protocol (SIP), etc., there are certain network elements that get overwhelmed and create a bottleneck for data flow, such as cellular base stations (or Node Bs) and their associated gateways. Several users within the range of one or more base stations who are downloading high-volume data from the network will have greater transmission power requirements from the base station. This may cause reduced signal strength per mobile device, and consequently a lower quality connection. Transmission power control can alleviate some but not all of these issues. This further causes higher battery usage on the mobile device itself.

Network operators generally offer alternative means to connect to their core networks, or to the Internet. Femtocells, Fiber-to-the-node (FTTN), and wireless local area network (WLAN or Wi-Fi) access points can provide access to various networks for mobile devices having more than one type of transceiver. For instance, the iPhone includes a Wi-Fi transceiver. A Wi-Fi hotspot/access point can be used to connect to a network, with broadband speeds, and the load on the cellular network can be reduced. However, there are specific issues that prevent the efficient selection of an access point. For instance, many users appear to disable Wi-Fi due to either a) concerns over battery life, or b) to avoid the annoying messages to connect to Wi-Fi every time an open access point is detected. Consequently, users often don't enable Wi-Fi as they may forget to turn it off afterwards. Leaving it on leads to a faster battery drainage, and leaving it off leads to connectivity issues as well as suboptimal power usage as the cellular transceiver may have to use more power for high-throughput communication with a base station. Constant user interaction with a connection manager to enable/disable the Wi-Fi transceiver does not provide for a seamless and streamlined user experience.

Consequently, what is needed is a means to intelligently determine if a mobile device is likely in the vicinity of an access point, and to determine if it is the optimal connection type based upon the circumstances at any given time and location.

SUMMARY OF THE INVENTION

The present invention provides devices, systems, and methods to offload the usage of a cellular network, and to maximize battery life, by intelligent selection of broadband network connections such as Wi-Fi access points. A Wi-Fi transceiver on a mobile device is activated when certain conditions are met. These conditions include, for instance, a particular time of day, an assessment that the mobile device is in a particular location, a radiofrequency (RF) fingerprint of the cell site serving the mobile device, etc. When these conditions are satisfied, the location of the mobile device is correlated with a database of known locations in which a one or more Wi-Fi access points are determined to exist. The Wi-Fi transceiver on the mobile device is activated and commanded to connect to a particular Wi-Fi access point. The database of known locations and corresponding Wi-Fi access points is populated by a variety of methods including but not limited to adding access points owned and operated by the operator of the cellular network, collecting usage information of other access points as reported by a plurality of mobile devices, and so on. The method may be triggered by a determination of a low signal strength of the cellular base stations or towers that provide service to the mobile device, by usage of a high-bandwidth application such as multimedia streaming, or by other triggers. Dynamic intelligence ensures that the appropriate connection method is used, and minimizes handovers to networks or access points that are unreliable or that are predicted to become inaccessible to the mobile device. The dynamic intelligence logic operates by monitoring the time, location of the mobile device, type of mobile device, data usage of the mobile device, and other factors described below. The logic can be situated on the mobile device, on a server on the network, or any combination thereof.

In one exemplary embodiment, the present invention is a method for intelligent selection of a Wi-Fi access point from a mobile device, including receiving a time of day from a network, assessing a location of the mobile device, determining availability of one or more Wi-Fi access points at the location, the determination including comparing the location of the wireless device with a database of known locations, each known location being associated with said one or more Wi-Fi access points, activating a Wi-Fi transceiver in the mobile device in response to one or more of the time of day, the location, and the availability of said one or more Wi-Fi access points, and triggering the mobile device to connect to a Wi-Fi access point. The method further includes activating the Wi-Fi transceiver and triggering the connection if the time falls within a predefined time block. Alternatively or additionally, the method includes receiving location information from a Global Positioning System (GPS) satellite. Alternatively or additionally, the method includes determining a radiofrequency (RF) fingerprint of one or more cell towers of the network, correlating the RF fingerprint with a location, and comparing the location with the database of known locations. The method further includes grading a performance of the Wi-Fi access point and transmitting the graded performance in a report to the network, wherein the report includes at least a throughput and a latency for the Wi-Fi access point.

In another exemplary embodiment, the present invention is a system for intelligent selection of a Wi-Fi access point from a mobile device, including a mobile device having a network interface and a Wi-Fi transceiver, a plurality of cellular base stations, the signal of each of the plurality of cellular base stations forming a cell site, wherein the network interface of the mobile device access a network via the cell site, a Wi-Fi access point in range of the mobile device, and logic to determine a location of the mobile device and to compare the location of the wireless device with a database of known locations, each location being associated with one or more Wi-Fi access points. The Wi-Fi transceiver in the mobile device is activated in response to a determination that the Wi-Fi access point is in the location of the mobile device and available for use, and the logic triggers the Wi-Fi transceiver to connect to the Wi-Fi access point. A server on the network may include the database of known locations, and the logic to activate and trigger the Wi-Fi transceiver. The system further includes a plurality of Wi-Fi access points in the cell site, wherein the server receives a plurality of reports from a plurality of mobile devices, each report providing a performance grade of at least one of the plurality of Wi-Fi access points, and wherein the server ranks the plurality of Wi-Fi access points based in part on the plurality of reports, and wherein the logic triggers the Wi-Fi transceiver to connect to the highest ranked of the plurality of Wi-Fi access points.

In yet another exemplary embodiment, the present invention is a device for intelligent selection of a Wi-Fi access point, including a processor, a memory coupled to the processor, a network interface coupled to the processor, a Wi-Fi transceiver coupled to the processor, wherein the Wi-Fi transceiver is initially in a deactivated state, and logic on the memory to receive a time of day from a network, assess a location of the mobile device, determining an availability of one or more Wi-Fi access points at the location, the determination including comparing the location of the mobile device with a database of known locations, each known location being associated with said one or more Wi-Fi access points, activate the Wi-Fi transceiver in response to one or more of the time of day, the location, and the availability of said one or more Wi-Fi access points, and trigger the mobile device to connect to a Wi-Fi access point. Executing a high-bandwidth application on the memory may cause the logic to activate the Wi-Fi transceiver and trigger the connection to the Wi-Fi access point. A user interface enables a user to grade the Wi-Fi access point based on performance, and transmit the grade in a report to a server on the network, wherein the report includes at least a throughput and a latency for the Wi-Fi access point.

DETAILED DESCRIPTION OF THE INVENTION

Figure 1:
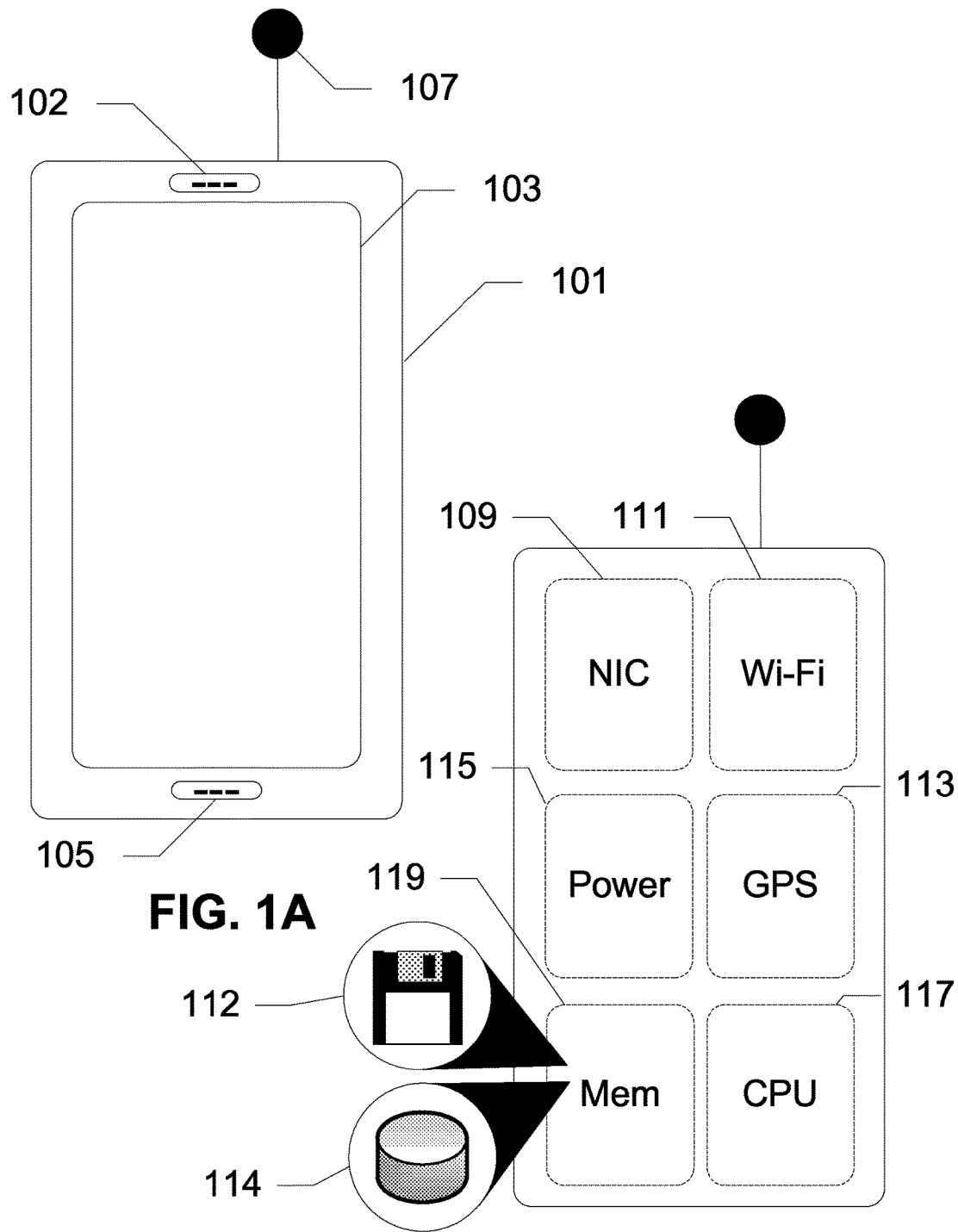
FIGS. 1A and 1B respectively show the external and internal components of a mobile device, according to an exemplary embodiment of the present invention.

The present invention provides devices, systems, and methods to offload the usage of a cellular network by intelligent selection of broadband network connections such as Wi-Fi access points. A Wi-Fi transceiver on a mobile device is activated when certain conditions are met. These conditions include, for instance, a particular time of day, an assessment that the mobile device is in a particular location, a radiofrequency (RF) fingerprint of the cell site serving the mobile device, etc. When these conditions are satisfied, the location of the mobile device is correlated with a database of known locations in which a one or more Wi-Fi access points are determined to exist. The Wi-Fi transceiver on the mobile device is activated and commanded to connect to a particular Wi-Fi access point. The database of known locations and corresponding Wi-Fi access points is populated by a variety of methods including but not limited to adding access points owned and operated by the operator of the cellular network, collecting usage information of other access points as reported by a plurality of mobile devices, and so on. The method may be triggered by a determination of a low signal strength of the cellular base stations or towers that provide service to the mobile device, by usage of a high-bandwidth application such as multimedia streaming, or by other triggers. Dynamic intelligence ensures that the appropriate connection method is used, and minimizes handovers to networks or access points that are unreliable or that are predicted to become inaccessible to the mobile device. The dynamic intelligence logic operates by monitoring the time, location of the mobile device, type of mobile device, data usage of the mobile device, and other factors described below. The logic can be situated on the mobile device, on a server on the network, or any combination thereof.

"Mobile device", as used herein and throughout this disclosure, refers to any electronic device capable of wirelessly sending and receiving data. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Mobile devices communicate with each other and with other elements via a network, for instance, a wireless network, or a wireline network. A "network" can include broadband wide-area networks such as cellular networks, local-area networks (LAN), wireless LAN (Wi-Fi), and personal area networks, such as near-field communication (NFC) networks including BLUETOOTH®. Communication across a network is preferably packet-based; however, radio and frequency/amplitude modulations networks can enable communication between communication devices using appropriate analog-digital-analog converters and other elements. Communication is enabled by hardware elements called "transceivers." Mobile devices may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A Wi-Fi network is accessible via "access points" such as wireless routers, etc., that communicate with the Wi-Fi transceiver to send and receive data. The Wi-Fi network can further be connected to the internet or other packet-based networks. The "bandwidth" of a network connection or an access point is a measure of the rate of data transfer, and can be expressed as a quantity of data transferred per unit of time.

A network typically includes a plurality of elements that host logic for performing tasks on the network. The logic can be hosted on servers. In modern packet-based wide-area networks, servers may be placed at several logical points on the network. Servers may further be in communication with databases and can enable communication devices to access the contents of a database. Billing servers, application servers, etc. are examples of such servers. A server can include several network elements, including other servers, and can be logically situation anywhere on a service provider's network, such as the back-end of a cellular network. A server hosts or is in communication with a database hosting an account for a user of a mobile device. The "user account" includes several attributes for a particular user, including a unique identifier of the mobile device(s) owned by the user, relationships with other users, application usage, location, personal settings, business rules, bank accounts, and other information. A server may communicate with other servers on different networks to update a user account.

A "location", as used herein and throughout this disclosure, is any physical location that is served by one or more networks. A mobile device has a "location" that can be determined via a plurality of methods such as Global Positioning System (GPS), Assisted GPS (A-GPS), cell tower triangulation, RF signatures, etc. and as described below. A lane on a road can be a location. A toll booth can be a location. A location may include a geo-fence. A geo-fence is a virtual perimeter around a location such that when a smart vehicle enters or exits the location, a notification is generated. A location can be determined using radio-location via signal measurement from base stations/cell towers, using GPS/A-GPS, or using proximity to NFC transceivers. The area of the location can be controlled by the number and range of the NFC transceivers. Determining a location as a function of time enables a measurement of rate of movement, or speed.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIGS. 1A and 1B respectively show the external and internal components of a mobile device, according to an exemplary embodiment of the present invention. Mobile device 101 includes a speaker 102, a display 103, a microphone 105, and an antenna 107. Mobile device 101 further includes a network interface (NIC) 109, a Wi-Fi transceiver 111, a Global Positioning System (GPS) receiver 113, a power supply 115, a central processing unit (CPU) 117, and a memory 119. Speaker 102 provides an audio output for mobile device 101. Display 103 is an LCD or LED or other type of display on which a user can view selections, numbers, letters, etc. Display 103 can also be a touchscreen, thereby being used as an input device. In embodiments not using a touchscreen, a keypad is typically used as an input device, for instance, to type a phone number or a message. Such a keypad may be a numerical keypad, a QWERTY keyboard, etc. Microphone 105 allows the user to verbally communicate with others using mobile device 101. Antenna 107 is a transducer designed to transmit or receive electromagnetic waves to and from a network. In conjunction with antenna 107, network interface 109 allows mobile device 101 to wirelessly communicate with a cellular network, or with other wireless devices across the cellular network. Network interface 109 may be a cellular transceiver, wireless transceiver, etc., and includes combinations of transceivers to communicate with assorted wireless networks. Wi-Fi transceiver 111 enables mobile device 101 to wirelessly communicate over short ranges with a Wi-Fi access point, and through the access point, to a packet-based network such as the Internet, and other devices on the internet. GPS transceiver 113 enables a determination of a location of mobile device 101, by receiving signals from a GPS satellite. In addition to these signals, network interface 109 can receive assistance data from an A-GPS server on the cellular network, thereby enabling GPS receiver 113 to get a faster "fix" on a satellite signal. Power supply 115 provides power to each of the components of mobile device 101, and can include a battery, as well as an interface to an external power supply. CPU 117 controls components of mobile device 101 according to instructions in logic stored on memory 119. Memory 119 comprises any computer readable medium, such as RAM, ROM, etc. Memory 119 stores logic 112, in addition to logic for operating the components of mobile device 101. Memory 119 further stores a database 114 including a set of rules such as defined time-blocks determining when Wi-Fi transceiver needs to be activated or de-activated, as well as a database of Wi-Fi access points corresponding to predefined locations. The contents of database 114 can be provisioned by an operator of the cellular network, or can be added to based on usage of device 101 as it accesses various access points in different locations.

Logic 112 constantly monitors a plurality of conditions that determine whether or not Wi-Fi transceiver 111 needs to be activated, and whether or not mobile device 101 needs to communicate over a Wi-Fi network as opposed to a cellular network. As described above, there are several combinations of conditions that trigger and enable the intelligent selection of Wi-Fi access points. Generally, these are as follows. First, a time schedule is referred to determine when Wi-Fi transceiver 111 will be activated and used to connect to a Wi-Fi access point. This simplest option is useful for users who wish to activate their Wi-Fi transceiver according to a predictable schedule, such as in terms of locations they visit, connecting to Wi-Fi access points at prescribed intervals according to where they are likely to be. For example, a user may set their mobile device to only look for Wi-Fi when they are typically at home every night. The time schedule is programmable via a user interface and stored either on database 114 or on a user account on the network.

The second trigger to connect to a Wi-Fi access point is using RF fingerprint assisted activation. Wi-Fi transceiver 111 is activated according to when a known RF fingerprint is noticed. This is a location-based service that uses an RF fingerprint of the cellular signals received by NIC 109 to determine that mobile device 101 is in a particular known location. An RF fingerprint is measured by NIC 109 fairly easily, since NIC 109 is constantly seeking out signals from cell towers that serve the area that mobile device 101 is currently in. As NIC 109 scans for cellular signals, it also receives a signal strength, a timing, and a certain amount of noise with the signal. This could include, for instance, a decibel level (to within a tolerance or threshold), a Signal to Noise plus Interference Ratio (SNIR), etc. Further, a plurality of signals from a plurality of cell towers is combined together to create a cellular sector, as will be shown in FIG. 4. This combination of characteristics provides a unique RF fingerprint for that particular location within the cell sector that mobile device 101 is being used in. For instance, an office building will have a different RF signature than the parking lot, although both locations are served by the same cell sector. Consequently, a particular RF signature can be associated with a specific location, and any available Wi-Fi access points can be associated with that particular location.

The RF signature of a particular location can be defined beforehand and stored on a database, such as database 114, or a database on a server on the cellular network. Alternatively, RF signatures can be modified and appended to, based on other users' experiences with that particular location. Over time, an average RF fingerprint is generated, and can be used to correlate locations with Wi-Fi access points available in that area. The correlation can occur on the mobile device itself, in which case the known RF fingerprints, corresponding locations and associated Wi-Fi access points are periodically downloaded to database 114. Alternatively, the correlation occurs on the network, with mobile device 101 transmitting the RF signature to a server on the network and receiving a list of access points to connect to. In either case, upon determining that the RF signature corresponds to a location having one or more available Wi-Fi access points, logic on either mobile device 101 or on a server on the network commands Wi-Fi transceiver 111 to connect to an appropriate Wi-Fi access point.

In alternative embodiments, Wi-Fi transceiver 111 is activated, available Wi-Fi access points are detected, and then Wi-Fi transceiver 111 is deactivated and regular cellular transmission via NIC 109 is resumed, until a high-bandwidth application is launched. Only when the additional bandwidth is needed is when the Wi-Fi is activated, thereby continuing to save battery power until absolutely necessary. The present invention also provides for automatic refreshing of the list of access points from a server on the network. Locally stored lists can be purged and replaced with updated lists at fixed intervals, for instance 30 or 90 days.

A third means to intelligently connect to a Wi-Fi access point is using an on-demand location based system. An example of such a system is AT&T's Network Event Location System (NELOS) described in U.S. patent application Ser. No. 12/712,424, the contents of which are hereby incorporated in their entirety in this disclosure. Briefly, signal path compensation is effected through determination of a propagation delay between one or more cell sites and a mobile device. Such determination is based, at least in part, on statistical analysis of the location of mobile devices throughout a coverage sector or cell. The locations can be generated through time fingerprint locating (TFL) measurements of wireless signals. Each reference frame from a set of reference frames is correlated to a pair of cell sites, and the set of reference frames is correlated to a set of geographical bin grid framework frame locations having a predetermined granularity. This enables a more precise determination of the location of mobile device 101 than traditional methods such as triangulation, etc. Consequently, the cellular network is aware of a precise location of mobile device 101, and a server on the network is equipped with logic that triggers an activation of Wi-Fi transceiver 111 based upon this location.

Pursuant to any prior contractual arrangement between a user of mobile device 101 and the network operator, logic on the network (on an application server, for instance) has the ability to override any user settings and turn on or activate Wi-Fi transceiver 111 depending upon a network-level determination of how much data is being throughput by mobile device 101. The network entity further has the ability to deactivate Wi-Fi transceiver 111 and switch back to communication using NIC 109. This feature is especially useful when, for instance, a "snapshot" or performance report needs to be generated for specific Wi-Fi access points in a location that mobile device 101 happens to be in. This is an example of the dynamic intelligence described above, providing a network operator with the ability to dynamically control how many devices are accessing the various network access points and distribute load evenly. This intelligence can be extended further to command a plurality of mobile devices to submit a plurality of reports of Wi-Fi access point availability in specific locations as determined by a network operator. The resulting reports can be used to generate a "map" of Wi-Fi coverage for the network. Combined with information on RF fingerprinting of cell sites described above, this offers a network operator with a heightened level of awareness as to how different aspects of their network are operating.

A fourth method to intelligently select a Wi-Fi access point is by enabling activation of Wi-Fi transceiver 111 by listening to cellular broadcasts received from the cellular network. This can be termed "Assisted Wi-Fi activation." Briefly, a very low bandwidth channel is employed by the cellular network that can be transmitted on any cellular system. The broadcast is transmitted to all mobile devices within the sector or cell site to see, and includes a Short Message System (SMS) or Multimedia Broadcast Multicast Service (MBMS). The broadcasted information includes all available Wi-Fi access points within the coverage area. For smaller cell sector sizes, the greater the likelihood that the mobile device receiving the broadcast is within range of an access point. This can be used independently, or in addition to the other methods described above, such as RF fingerprinting. For instance, the broadcast can include coordinates (latitude, longitude, or equivalent coordinate systems) for specific access points, and mobile device 101 can pick the nearest access point based upon a determination of its own location. This provides an ideal level of optimization for the network, minimizing the use of cellular bandwidth.

A fifth method for intelligent Wi-Fi access point selection involves a location aware Wi-Fi activation, i.e. the Wi-Fi transceiver 111 is activated anytime that mobile device 101 is aware (via GPS or other methods) that it is in the proximity of an access point. The awareness can be triggered upon the launch of any location-based service application, such as Maps, Navigation, etc. In either case, anytime the mobile device is aware of its location, a correlation can be made with either database 114 or a database on the network, and available Wi-Fi access points can be connected to. Generally, GPS receiver 113 is employed to determine a location of mobile device 101. With this feature, the following information is readily accessible: service area (city, state, country), location (longitude, latitude, street number), moving speed, and so on. The service area information is used to determine whether a mobile device is in a service control area. For devices without a GPS receiver, a cell tower location ID (cell ID) can be used for a less accurate measurement. Cellular tower based localization can provide such information.

In exemplary embodiments of the present invention, all of the above-described activation methods are triggered only when a threshold bandwidth or data transfer rate is exceeded, or if a high-bandwidth application is launched. Logic on either mobile device 101 activates Wi-Fi transceiver 111, or logic on an application server on the network initiates the activation process. In additional embodiments, a database on the application server is dynamically updated every time Wi-Fi transceiver 111 is activated and scans the location for Wi-Fi access points. The reporting of the available Wi-Fi access points, their signal strengths, and availability, is transmitted to the network from a plurality of mobile devices, and this information is used to build up the database of access points. Further, access points can be ranked based on a performance grade as measured by the mobile devices, and subsequent commands to connect to a Wi-Fi access point as specific as to the highest-ranked access point.

Logic 112 further collects information such as speed of mobile device 101 (also accessible via GPS receiver 113), and determines that a specific access point is futile to connect to because it would lose its signal in a few seconds, depending on the measured speed. For instance, rapid movement along a roadway is probably sufficient to determine that mobile device 101 should stay on the cellular network and not connect to an access point, however highly ranked, because mobile device is in motion and will probably lose the Wi-Fi signal. Generally, different combinations of the above conditions may depend on the different service requirements, e.g., target users, control accuracy, control flexibility and etc. It may also be limited by the implementation complexity.

Figure 2:
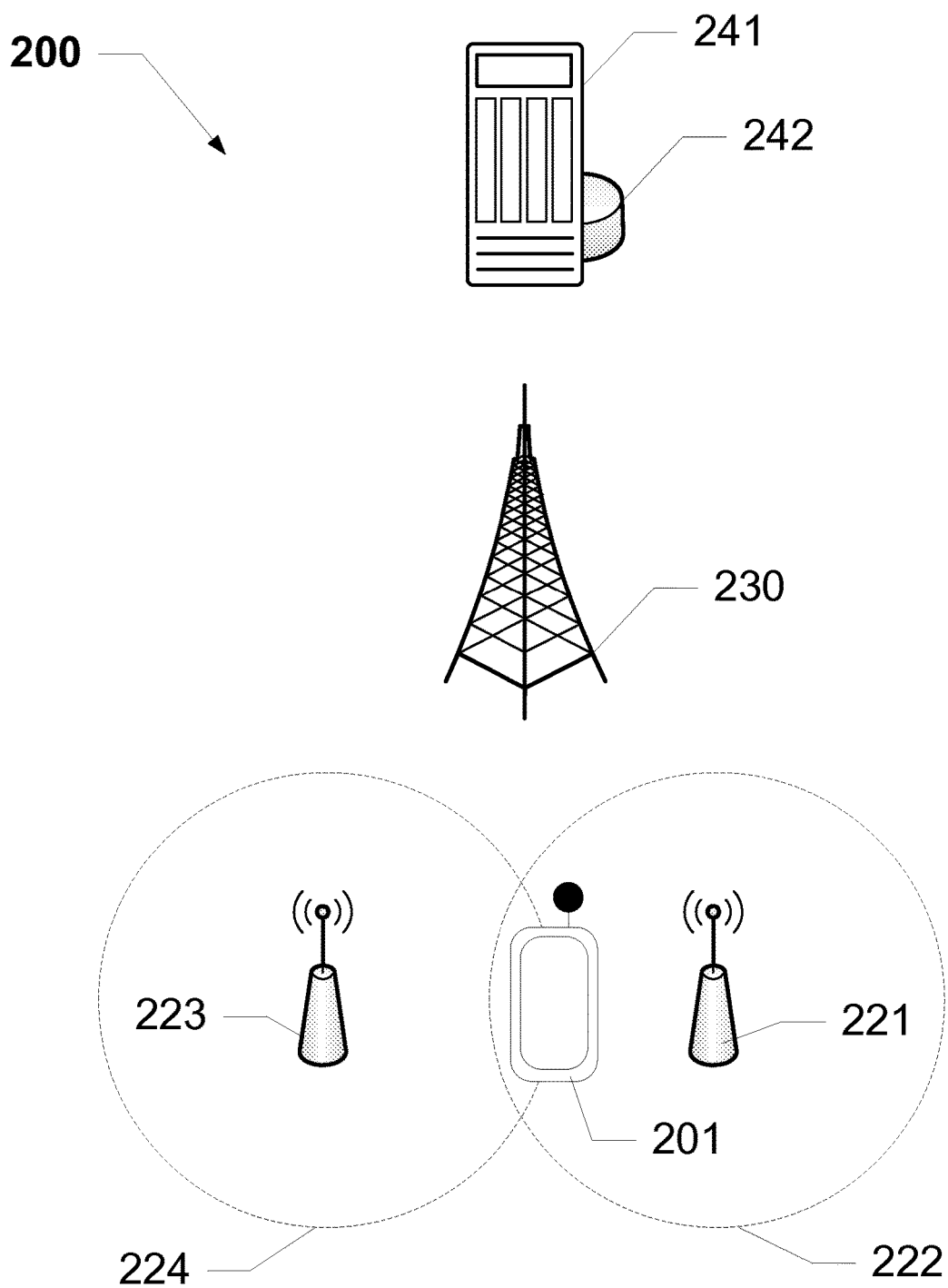
FIG. 2 shows a system for intelligent selection of Wi-Fi access points, according to an exemplary embodiment of the present invention.

FIG. 2 shows a system 200 for intelligent selection of Wi-Fi access points, according to an exemplary embodiment of the present invention. Mobile device 201 is within range of access points 221, and 223, each having a respective range 222 and 224. Mobile device 201 also communicates via a cellular transceiver with cell tower 230, which is part of a base station (or NodeB in a UMTS system). Cell tower 230 provides access to a cellular network 231, the elements of which are known in the art and therefore not shown. On the back end of cellular network 231 is an application server 241 hosting a database 242. Access points 221, 223 can be Wi-Fi transceivers, femtocells, etc. Access points 221, 223 provide mobile device 201 with access to a packet based network such as the internet and/or cellular network 231. In the case of a femtocell, mobile device 201 would use a cellular transceiver to communicate with the femtocell, but this communication would still alleviate the burden on elements of cellular network 231 accessible via cell tower 230.

In operation, the Wi-Fi transceiver on mobile device 201 is initially in an inactive state to save power. Logic, either on mobile device 201 or on application server 241, constantly monitors a plurality of conditions that determine whether or not a Wi-Fi transceiver on mobile device 201 needs to be activated. Generally, access points 221, 223 can be in the same location/cell site but have different ranges 222, 224. Mobile device 201 reports a location as described above to server 241 via tower 230. Server 241 determines that access point 221 is ranked higher than access point 223, based on a correlation of the precise location of mobile device 201 and the location of access points 221, 223. Further, a ranking system as described above can be employed to dynamically select between access points 221, 223, and cell tower 230. There are several combinations of conditions that trigger and enable the intelligent selection of Wi-Fi access points 221, 223, as described above. For instance, a time schedule can be defined by a user of mobile device 201, and if a time of day falls within a portion of the time schedule, the dynamic selection is initiated.

An RF fingerprint can be employed to assist activation of the Wi-Fi transceiver. The RF fingerprint of one or more towers 230 is measured by mobile device 201, transmitted to server 241, and correlated with known locations in database 242. Wi-Fi transceiver is activated according to a determination of available access point in the corresponding known location. Further, RF signatures can be modified and appended to, based on other users' experiences with that particular location. Upon determining that the RF signature corresponds to a location having one or more available Wi-Fi access points, logic on either mobile device 201 or on the network commands the Wi-Fi transceiver to connect to an appropriate Wi-Fi access point 221 or 223. Further, an on-demand location based system provides a detailed location of mobile device 201, as described in the NELOS patent application. Cellular broadcasts received from tower 230 can further assist a selection of access points 221, 223. Broadcasted information includes a listing of available Wi-Fi access points, and mobile device 201 can pick the nearest access point based upon a determination of its own location, as well as a performance grade of the access points. Finally, anytime that mobile device 201 is aware of its precise location, for instance via GPS or A-GPS, a correlation can be made with a database 242 or a database on mobile device 201, and the Wi-Fi transceiver is activated.

Figure 3:
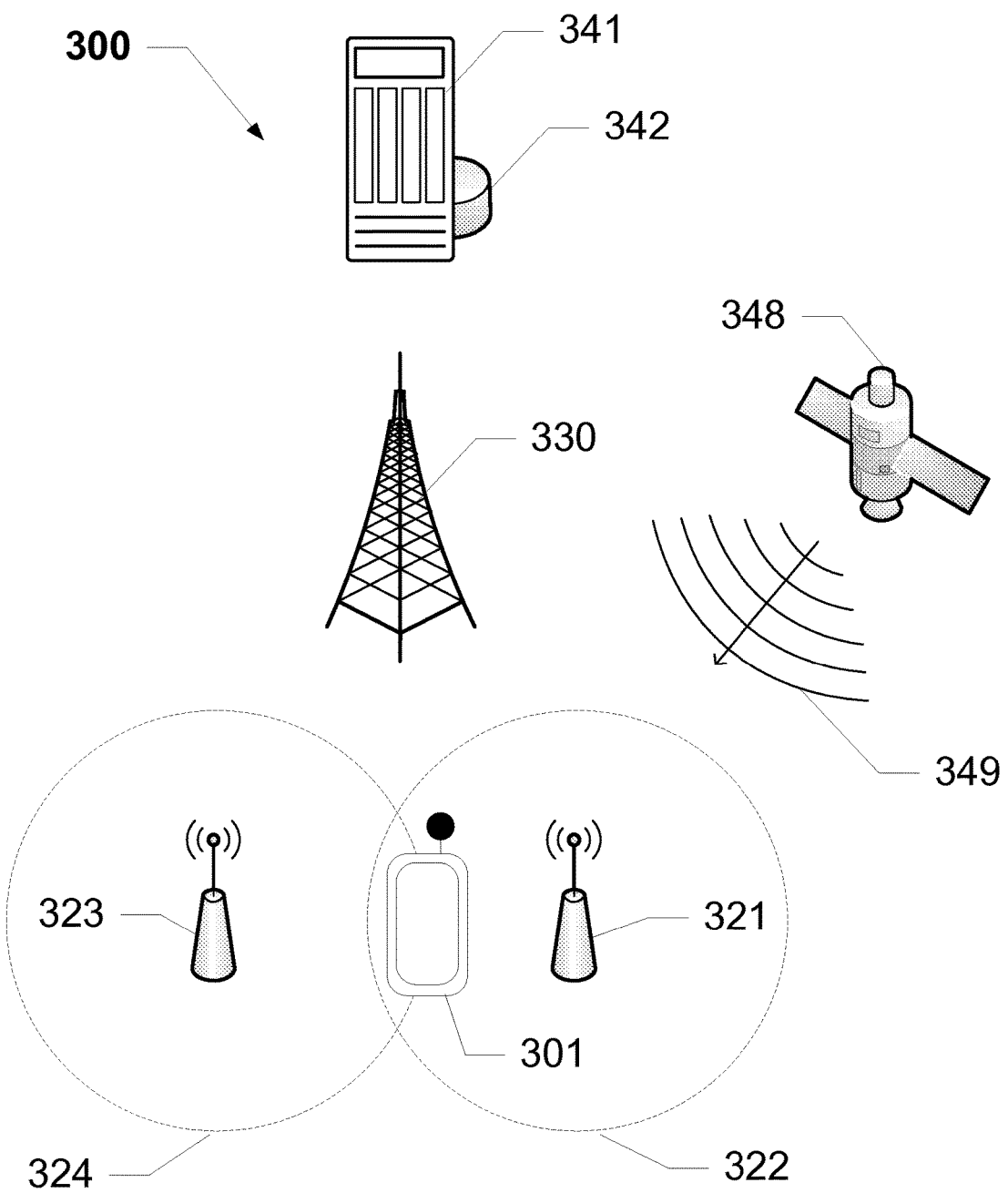
FIG. 3 shows another system for intelligent selection of Wi-Fi access points, according to an exemplary embodiment of the present invention.

FIG. 3 shows a system for intelligent selection of Wi-Fi access points, according to an exemplary embodiment of the present invention. System 300 is virtually identical to system 200, with the exception of a GPS satellite 348, transmitting a signal 349. Signal 349 is received by a GPS receiver in mobile device 301, and enables a precise location assessment. Assistance data from a A-GPS server (not shown) on cellular network 331 can be delivered via tower 330. Mobile device 301 reports the location to application server 341 as described above. Several additional combinations of conditions trigger and enable the intelligent selection of one of Wi-Fi access points 321, 323, as described above. Other features such as a Wi-Fi performance test, etc, can be commanded to mobile device 301 from dynamic intelligence on server 341.

Figure 4:
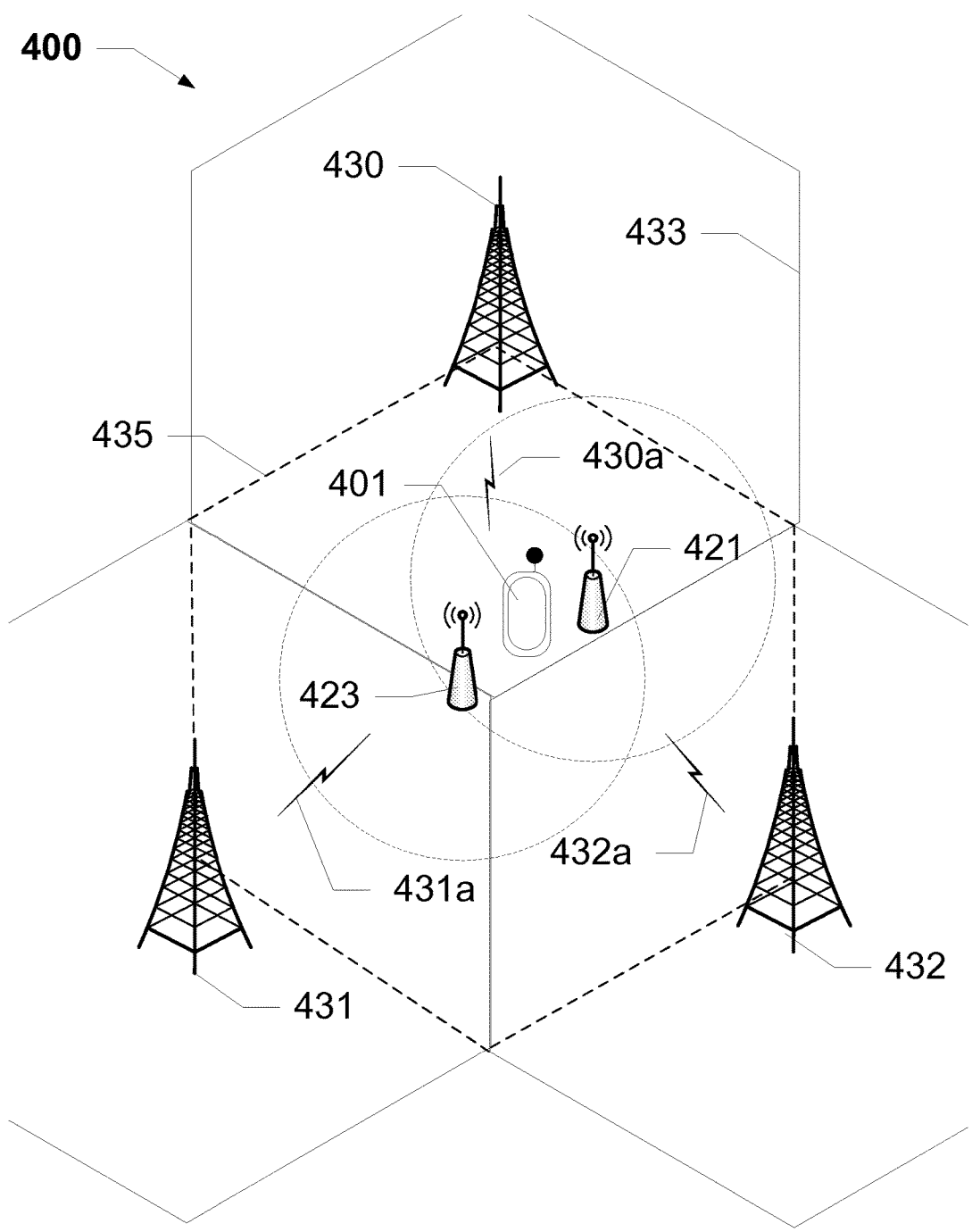
FIG. 4 shows a system for intelligent access point selection using a RF fingerprint, according to an exemplary embodiment of the present invention.

FIG. 4 shows a system for intelligent access point selection using a RF fingerprint, according to an exemplary embodiment of the present invention. Three cell towers 430, 431 and 432 each cover an area 433, using one or more antennas pointed radially away from each other. It should be appreciated that network deployments can encompass any number of areas 433. Further, areas 433 are illustrated as hexagons; however, coverage cells can adopt other geometries generally dictated by a deployment configuration, location, etc. Two towers can be coupled together form a pair, using links such as cables, ports, switches, connectors, etc. A radio network controller (not shown) can be part of the Radio Access Network (RAN) encompassing towers 430, 431, and 432. The RNC can be distributed among the set of towers 430, 431, 432 or associated base station/NodeB equipment. Cell sector 435 is formed by towers 430, 431, and 432, and mobile device 401 can communicate with each tower respectively through communication links 430*a*, 431*a*, and 432*a*.

An RF fingerprint is measured by mobile device 401 by tuning into each signal 430*a*, 431*a*, and 432*a* available in sector 435. A signal strength, a timing, and a certain amount of noise with the signal, such as SNIR, is measured. Timing of wireless signals takes into consideration the time from wave signal generation or output at a tower to detection at mobile device 401. Such time includes site timing through link(s) to antenna(s) and propagation time over the air interface or wireless channel. Timing delay typically is caused by various sources, for instance mismatches among electronic elements and components (impedance mismatch), stray capacitances and inductances, length of the antenna(s) cable(s) in base stations, tower height, multipath, reflections, etc. For every precise location, determined to a granularity, within sector 435, a unique RF fingerprint is measured. The precise location can be determined by set of reference frames, each reference frame correlated to a pair of cell sites, and correlating the set of reference frames to a set of geographical bin grid framework frame locations having a predetermined granularity, as described in the NELOS patent. The measured RF signature can be associated with the specific location, and any available Wi-Fi access points 421, 423 are associated with that particular location. The RF signature is modified and appended to, based on other users' experiences with that particular location. Over time, an average RF fingerprint is generated, and can be used to correlate locations with Wi-Fi access points available in that area. The correlation can occur on the mobile device itself, in which case the known RF fingerprints, corresponding locations and associated Wi-Fi access points are periodically downloaded to device 401. Alternatively, the correlation occurs on the network, with mobile device 401 transmitting the RF signature to a server on the network and receiving a list of access points to connect to. In either case, upon determining that the RF signature corresponds to a location having one or more available Wi-Fi access points, Wi-Fi transceiver in mobile device 401 is commanded to connect to an appropriate Wi-Fi access point 421, 423.

Figure 5:
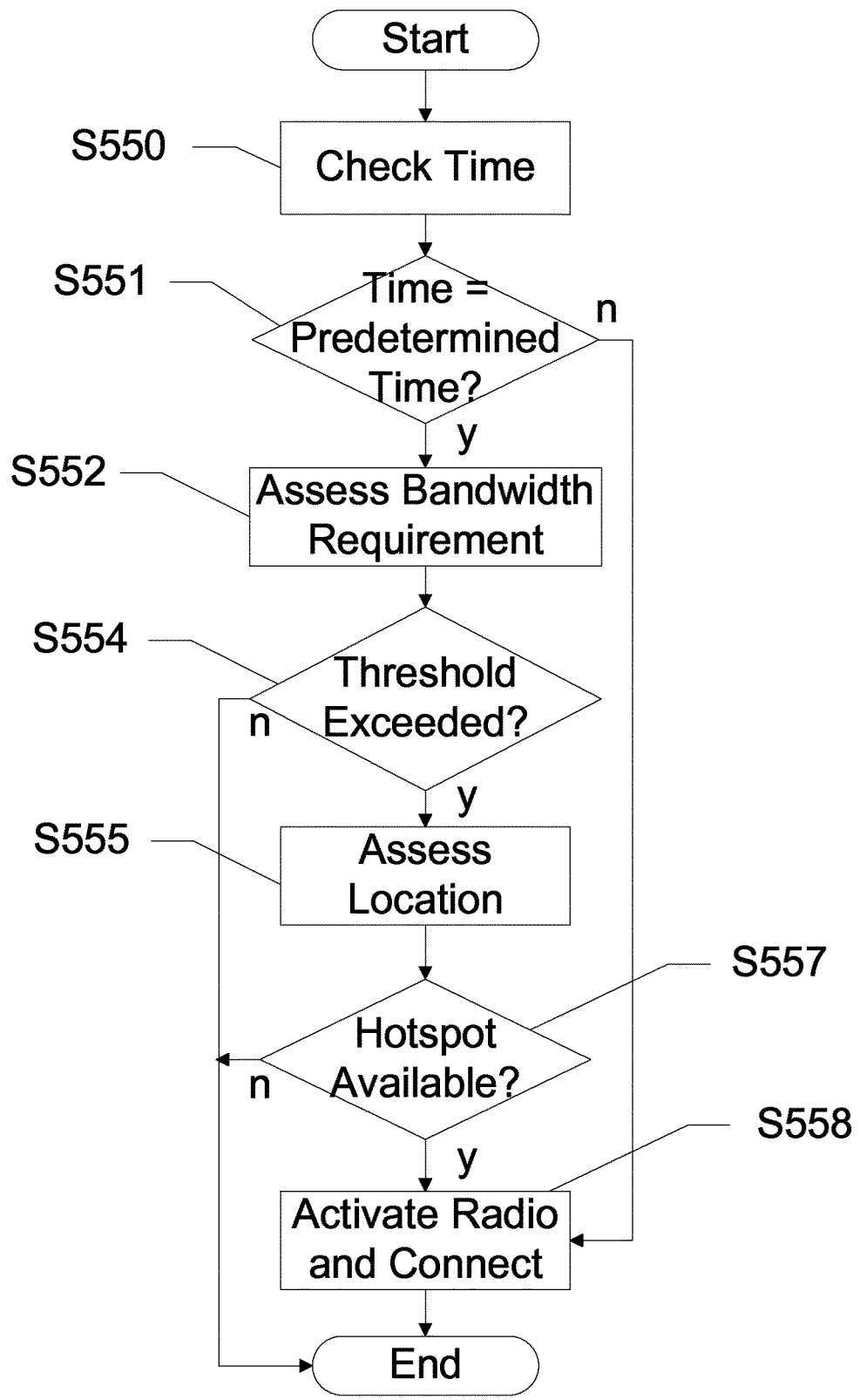
FIG. 5 shows a method for intelligent selection of an access point, according to an exemplary embodiment of the present invention.

FIG. 5 shows a method for intelligent selection of an access point, according to an exemplary embodiment of the present invention. As described above, a logic on either the mobile device or the network constantly monitors a plurality of conditions that determine whether or not a Wi-Fi transceiver needs to be activated, and whether or not the mobile device needs to communicate over a Wi-Fi network as opposed to a cellular network. At step S550, a current time of day is monitored. At step S551, the current time is compared to a time schedule to determine if an access point is available and to connect to the access point. A user having a predictable schedule, such as what time they get home from work, or someone who wishes to use a femtocell or other transceiver at home, can use this time schedule option. The time schedule is programmable via a user interface and stored on a local database or on the network. If there is a match, the Wi-Fi transceiver/radio is activated at step S558, and connected to the selected access point. Alternatively, the radio can be activated, can monitor available access points, and then deactivated without connecting. This is useful to gain an awareness of available access points at a specified time so that if any other triggers are detected, then the available access point can be accessed on demand. A flag can be set to a particular access point during a particular time block, and this flag is stored locally or on a network database. This could potentially save battery power for future uses within that time block.

At step S552, a bandwidth requirement is assessed. This is achieved by monitoring throughput via the cellular transceiver, or by monitoring the usage of one or more applications on the mobile device. If the throughput exceeds a defined threshold in S554, then the Wi-Fi is activated S558, otherwise further triggers are needed to trigger the intelligence. This helps to save battery power until absolutely necessary. At step S555, a location of the mobile device is assessed. As described above, this is achieved in one or more of several methods. For instance, a known RF fingerprint is measured using the cellular transceiver, and associated with a specific location, and any available Wi-Fi access points can be associated with that particular location. If the correlation in S557 returns positive results, then the radio is activated. Alternatively, an on-demand location based system is employed, such as disclosed in the NELOS patent application. Alternatively, a cellular broadcast received from the cellular network provides a list of available access points for the particular location. The broadcast is transmitted to all mobile devices within the sector or cell site to see, and includes a Short Message System (SMS) or Multimedia Broadcast Multicast Service (MBMS). This can be used independently, or in addition to the other methods described above, such as RF fingerprinting. Alternatively, anytime that the mobile device is aware (via GPS or other methods) that it is in the proximity of an access point, the intelligence of step S558 can be triggered. Generally, any time there is a correlation between an assessed location S555 and a known location containing access points S557, the radio can be activated 558. Further, these location-based activation methods may be triggered only when a threshold bandwidth or data transfer rate is exceeded as in step S552.

Additionally, access points can be ranked based on a performance grade as measured by the mobile devices, and subsequent commands to connect to a Wi-Fi access point as specific as to the highest-ranked access point. For instance, an application created by a network operator or third party includes on-board logic that periodically refreshes a list of access points, and monitors the above disclosed triggers to activate the Wi-Fi transceiver. The application acts as a connection manager, grades the access points using, for instance, a qualification factor that is a combination of historical data about the particular access point, combined with the quality of the signal of the access point at the present time. The access points can be ranked based on this factor, and the rank can be stored locally and/or submitted to a server on the network to be made available to other mobile devices that happen upon the same location at a future time and that have installed the particular application. This could also be extended to access points that are not operated by the network operator, such as Unlicensed Mobile Access (UMA) access points, public Wi-Fi, etc. These access points are also associated with the specific location, graded based on a qualification factor, and added to the database.

Figure 6:
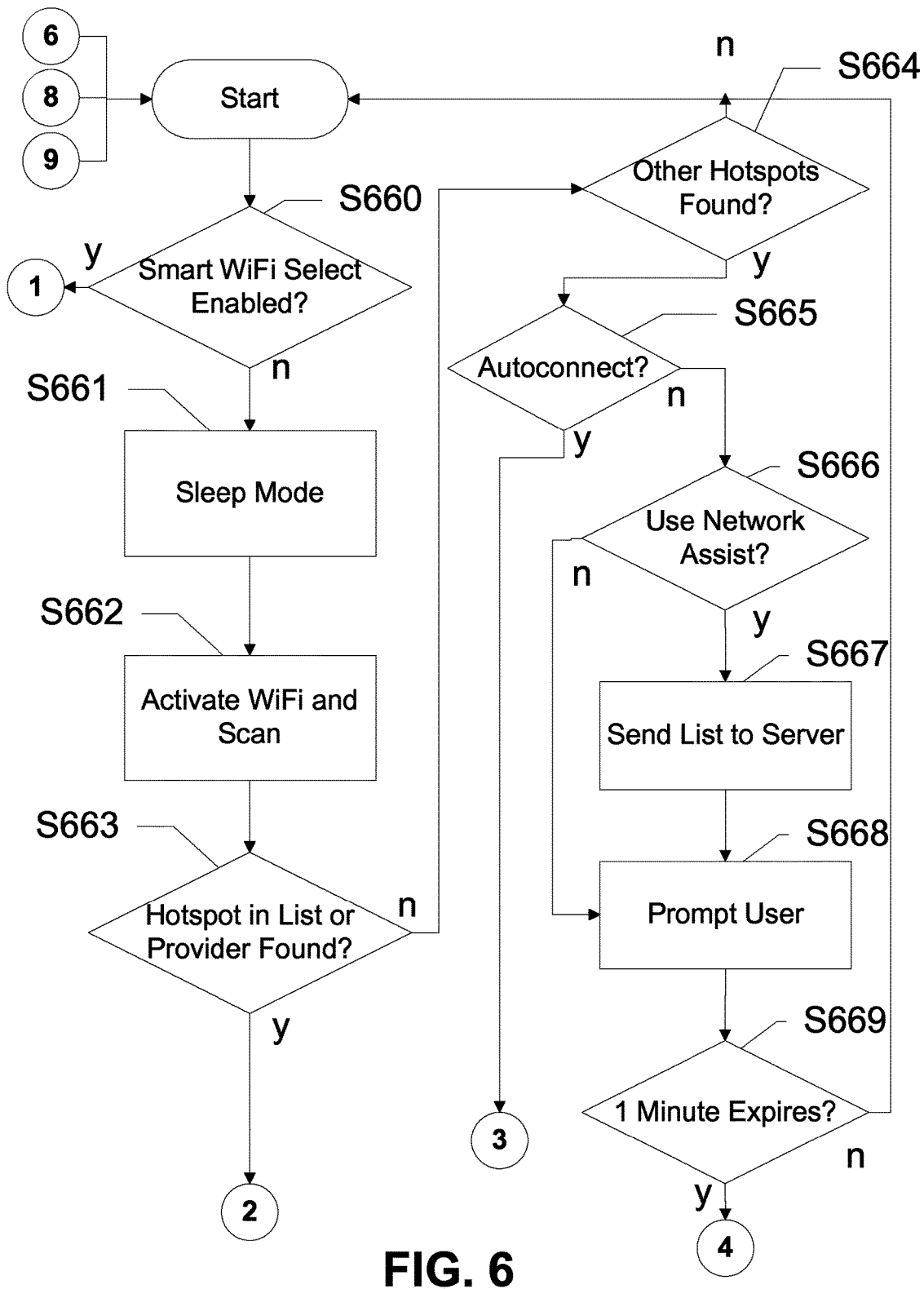
FIG. 6 shows a normal scan and prompting mode of a mobile device, according to an exemplary embodiment of the present invention.

FIGS. 6-10 show more detailed steps in the method of the present invention, according to an exemplary embodiment. FIG. 6 shows a normal scan and prompting mode of a mobile device, according to an exemplary embodiment of the present invention. In this embodiment, the method starts with a determination of whether a Smart WiFi mode is enabled S660. If the Smart WiFi mode is enabled, the Smart Wifi Mode is activated and begins in FIG. 8 at Point 1. If the Smart WiFi mode is not enabled, the default mode, the mobile device enters a sleep mode S661. The sleep mode is programmable, by a user or an operator via, for instance, a settings area of a user interface, and includes the option to set a default sleep time. At the end of the prescribed period of time, the mobile device activates a WiFi transceiver on the mobile device and scans for available networks, or access points S662. The available access points are captured in a list. With the available access points listed, the mobile device determines whether any of the available access points match a list of access points for the service provider of the mobile device S663. These may be access points operated by the service provider or otherwise known to the service provider. If an access point matches with the service provider list (as stored in a database on an application server, for instance), the mobile device enters common connect and store mode, seen in FIG. 10 at Point 2. If no access points match the service provider list, the logic determines whether other access points are found S664. If no other access points are found, meaning the original list of scans was empty, the method starts over. In other access points are found, the mobile device determines whether the device is authorized to automatically connect to an open access point S665. This authorization may be made by the user after receiving a prompt disclaiming the potential hazards of using open access points. If the mobile device is authorized to automatically connect to open access points, the process proceeds to the autoconnect mode beginning in FIG. 7 at Point 3. If the mobile device is not authorized to automatically connect to open access points, the device determines whether or not to use network assistance S666. The network assistance includes, for instance, a low-bandwidth broadcast transmitted to all mobile devices within the cell sector. This option may be preset by the user, with the user deciding whether to simply receive a list of available access points or have the cellular network recommend an access point. If network assist is enabled, the mobile device sends the list of detected access points to a server on the network S667. This may include the MAC address of each of the access points, as well as a signal strength, and other attributes. The server ranks these access points based on a combination of received attributes and historical data, and sends the results back to the mobile device. Logic enables the Wi-Fi transceiver to connect to the highest-ranked access point as determined by the server S668. The mobile device may be given the SSID, Mac address, WiFi RSSI, etc. of the access points. The user may also be able to see the full list of available access points. If network assistance is not enabled, the user is prompted to select an access point from among the highest-ranked access points S668. In this case, the rank may be based upon signal strength, encryption, etc. With the user prompted to select an access point, the mobile device determines whether the user has selected an access point or whether a set time for selection has expired S669. For instance, the user may be given one minute from the time of the prompt to select an access point. If the user selected a network, the mobile device enters common connect and store mode, seen in FIG. 10 at Point 4. If the timer expires before the user selects an access point, the method begins again.

Figure 7:
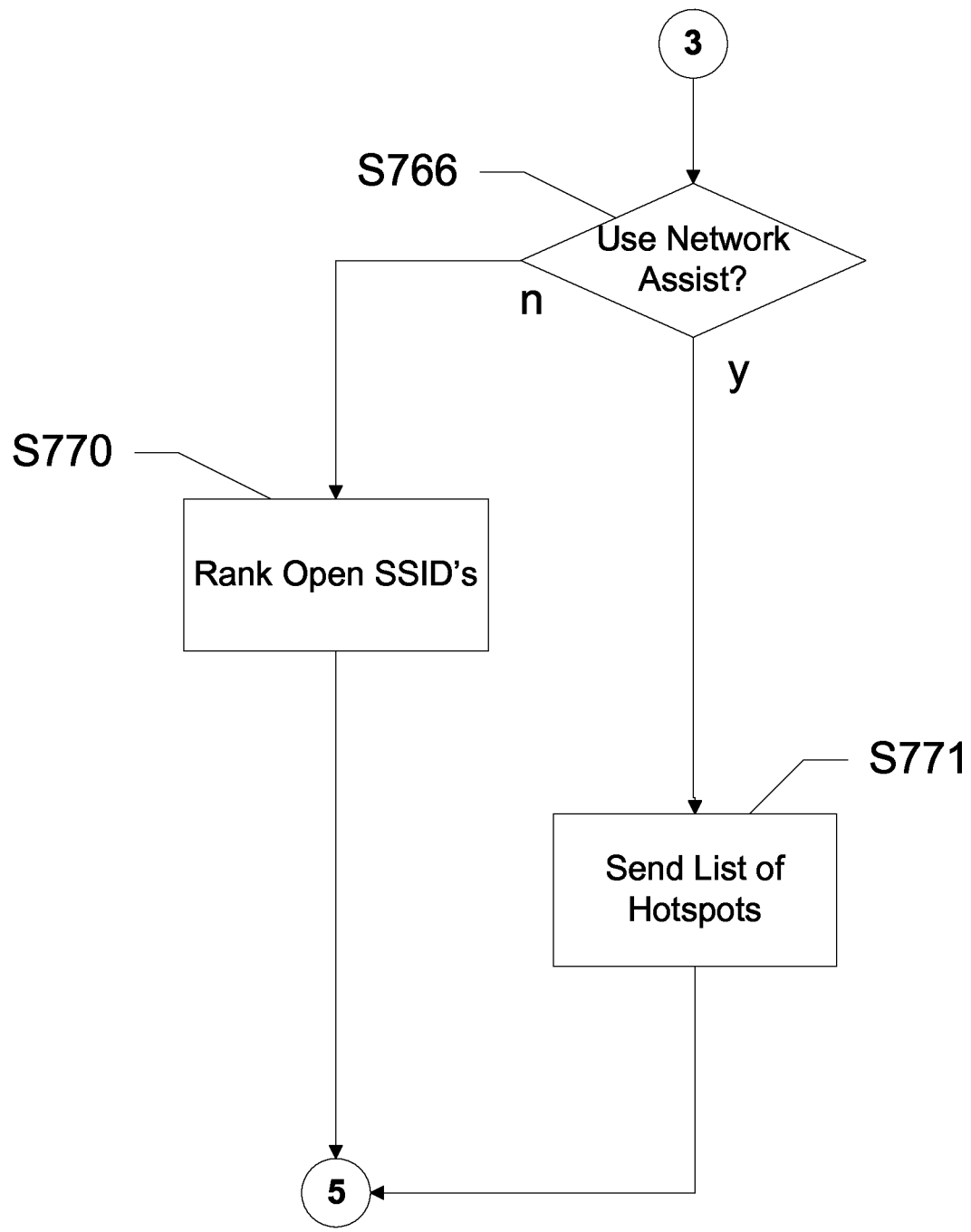
FIG. 7 shows an auto-connect option of a mobile device, according to an exemplary embodiment of the present invention.

FIG. 7 shows an auto-connect option of a mobile device, according to an exemplary embodiment of the present invention. In this embodiment, the mobile device has been authorized to automatically connect to open access points. The auto-connect option is entered at Point 3 and begins by determining whether or not to use network assistance S766. If the network assistance option is not enabled, the mobile device proceeds to ranking the SSID's of available access points by signal strength, for instance by measuring the power ratio in decibels (dB) of the measured power referenced to one milliwatt (mW), or dBm in step S770. The mobile device then enters common connect and store mode at Point 5. If the network assistance option is enabled, the mobile device proceeds to send a list of access points seen to a server on the cellular network S771. This may include the MAC address of each of the access points. The server ranks these access points and sends the results back to the mobile device and prompts the user with the highest-ranked access point as determined by the server. The mobile device may be given the SSID, Mac address, WiFi RSSI, etc. of the access points. The user may also be able to see the full list of available access points. At this point, the mobile device enters common connect and store mode at Point 5.

Figure 8:
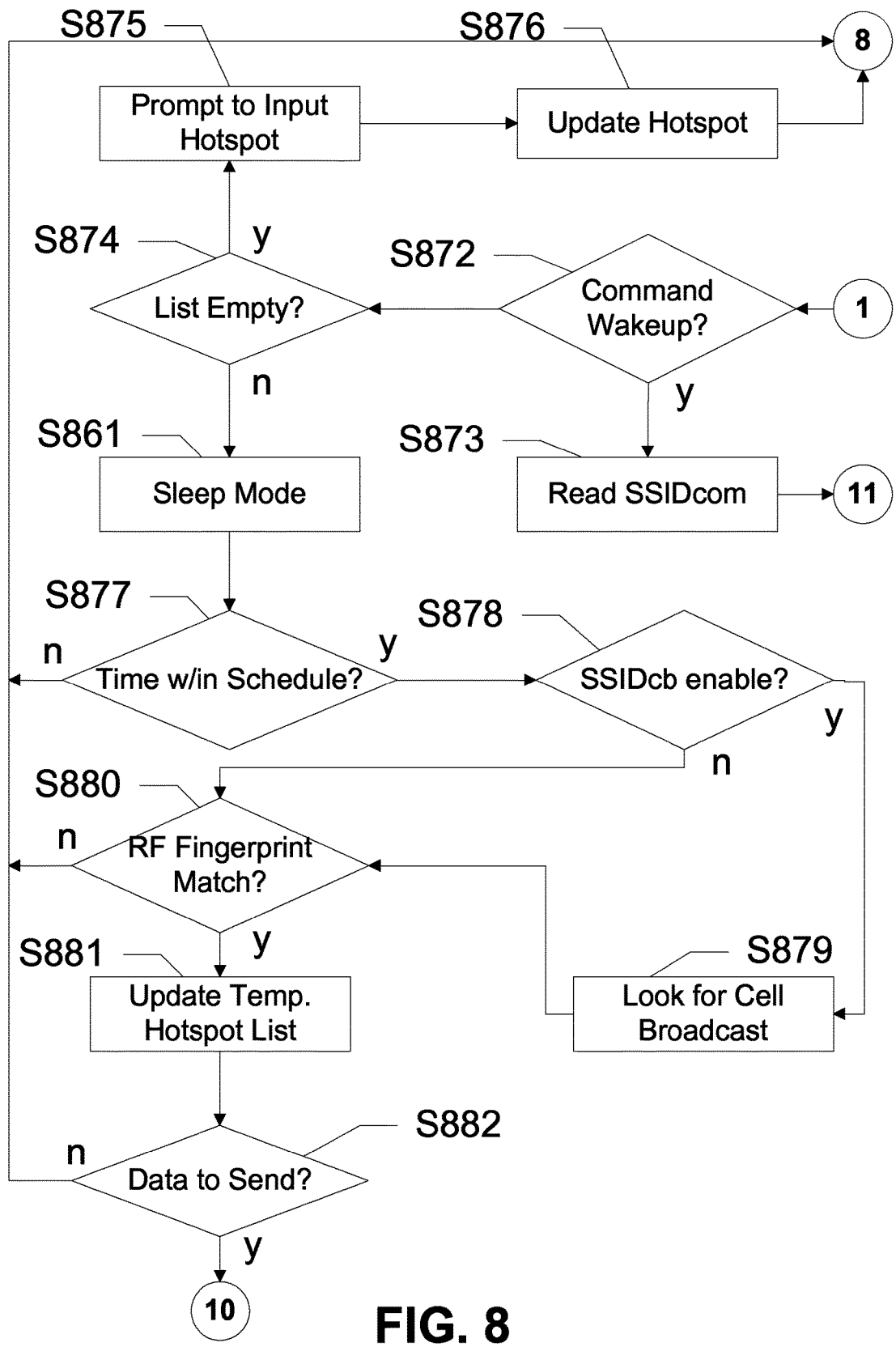
FIGS. 8 and 9 show a smart WiFi mode of a mobile device, according to an exemplary embodiment of the present invention.
Figure 9:
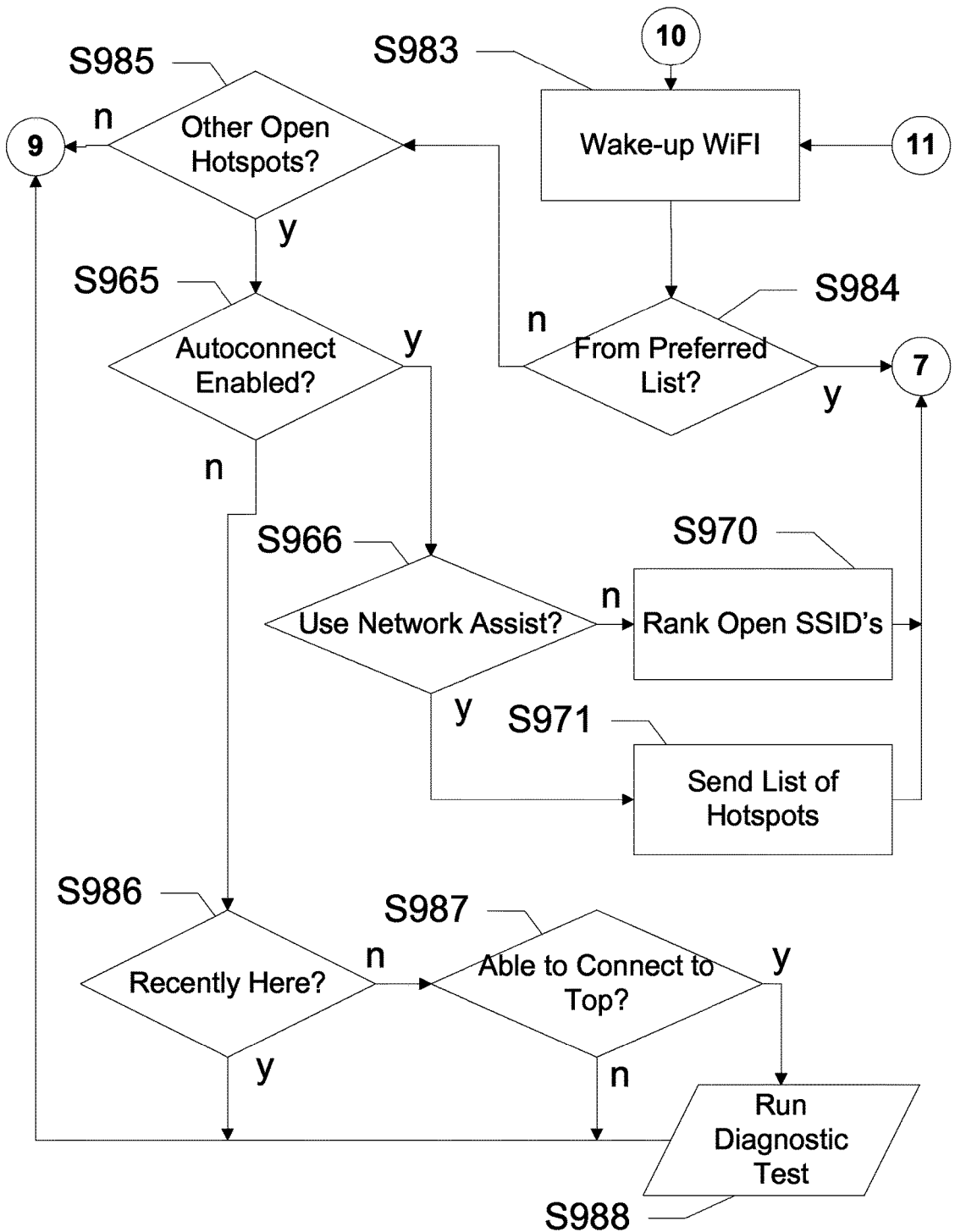

FIGS. 8 and 9 show a smart WiFi mode of a mobile device, according to an exemplary embodiment of the present invention. In this embodiment, if smart WiFi mode is enabled on the mobile device, at Point 1 the mobile device enters smart WiFi mode. The smart WiFi mode begins with a determination of whether there has been a command for the mobile device to activate S872. This determination may include whether the command occurred in a period of time before the determination, such as within the last five minutes. If there has been a command to activate, the mobile device proceeds to read SSIDcom mode S873. A SSIDcom refers to a variable that stores the preferred or highest-ranked access point. In SSIDcom mode, the mobile device updates a temporary access point list with an existing access point list plus the preferred/highest-ranked access point to connect to as ranked by the server (the SSIDcom). The mobile device then proceeds Point 11, where the device enters activate WiFi and scan mode seen in FIG. 9. If there has not been a command to activate, the mobile device determines whether the access point list is empty S874. Since in this mode the mobile device intelligently chooses WiFi access points from a list of access points, if the access point list is empty, the mobile device proceeds to prompt the user to input an access point S875. If the list is not empty, the device enters a sleep mode S861. At the prompt user to input an access point step S875, the user is prompted that the smart WiFi mode needs access points pre-populated in a list on the mobile device. The user is prompted to enter an access point or may choose from a list. A list is presented to the user with respect to any existing access points and/or the user is able to manually enter this information. The user may also choose to cancel this entry. The mobile device proceeds to update any access point which has been selected or add an access point to the list S876.

At this point, the mobile device proceeds to Point 8, where the mobile device proceeds back to the start of the normal scan and prompt mode. When the device is in the sleep mode S861 the mobile device remains in sleep mode for a prescribed period of time, such as five minutes. The mobile device then proceeds to determine whether the time is within the schedule S877. The user has pre-determined at what timeframes this mode operates. This may be a day of the week, a start hour and stop hour, etc. If the current time is within the allowable time period, the mobile device proceeds to a SSIDcb enable comparison stage S878. If the current time is not within the allowable time period, the mobile device proceeds to Point 8, where the mobile device starts the normal scan and prompting mode. At the SSIDcb enable comparison stage S878, the mobile device determines whether it should look for a cell broadcast WiFi assist. This assistance notifies the mobile device of an access point or access points in the area. If the SSIDcb is enabled, the mobile device looks for a cell broadcast S879. After looking for the cell broadcast, or if the SSIDcb is not enabled, the mobile device determines whether there is an RF fingerprint match S880. At this stage, the mobile device compares the existing cellsites it sees with associated parameters. If any two cellsites are within, for instance, six dB of those in the stored fingerprint of its existing access point list, the mobile device proceeds to update the temporary access point list S881, else the mobile device proceeds back to Point 8, where the normal scan and prompt mode will start. With the temporary access point list updated, the mobile device determines whether there is any data to send S882. If there is not any data to send, the mobile device proceeds to Point 8, where the normal scan and prompt mode will start. If there is data to send, the mobile device, enters Point 10 and activates the WiFi transceiver S983, seen in FIG. 9.

At activation of the WiFi transceiver S983, WiFi access points are scanned for and any found are collected and added to a found list. The list of detected access points is compared against an existing list (defined by the user, service provider, or historical data) to determine if any of the access points are preferred S984. If a match or matches are found, the mobile device ranks the access points found according to the signal strength, quality, or other metric such as the qualification factor described above, and passes the list to the common connect and store mode at Point 7. If a match is not found, the mobile device proceeds to determine whether other access points are found S985. If other access points are found, the mobile device proceeds to determine whether the auto-connect option is enabled S965. If other open access points are not found, the mobile device returns to the start of the normal scan and prompt mode at Point 9. If the auto-connect option is enabled, the mobile device determines whether or not to use network assistance S966. If the network assistance option is not enabled, the mobile device proceeds to ranking the SSID's of available access points by dBm S970. At this step, the mobile device ranks the list of open SSID's by dBm, an abbreviation for the power ratio in decibels (dB) of the measured power referenced to one milliwatt (mW). The mobile device then enters common connect and store mode at Point 7. If the network assistance option is enabled, the mobile device proceeds to send a list of access points seen to a server on the cellular network S971. This may include the Mac address of each of the access points. The server ranks these access points and sends the results back to the mobile device and prompts the user with the top access point as determined by the server. The mobile device may be given the SSID, Mac address, WiFi RSSI, etc. of the access points. The user may also be able to see the full list of available access points.

At this point, the mobile device enters common connect and store mode at Point 7. If the auto-connect option is not enabled, the mobile device determines whether the mobile device has reached this step recently S986. To avoid connecting repeatedly when someone is in the same location, the mobile device checks the last time it reached this stage. If it did recently reach this stage, recently being a pre-set amount of time, the mobile device returns to the start of the normal scan and prompt mode at Point 9. If the mobile device was not recently at this stage, the mobile device determines whether it is able to connect to the top access point S987, as defined by the access point with the highest signal strength. If the mobile device cannot connect to the top access point, the mobile device returns to the start of the normal scan and prompt mode at Point 9. If the mobile device can connect to the top access point, the mobile device runs a diagnostic test S988. This test may include measuring the average bytes per second of uploads and downloads, as measured over a ten second test; testing the ping latency;

reporting cell IDs seen; etc. After this stage, the mobile device returns to the start of the normal scan and prompt mode at Point 9.

Figure 10:
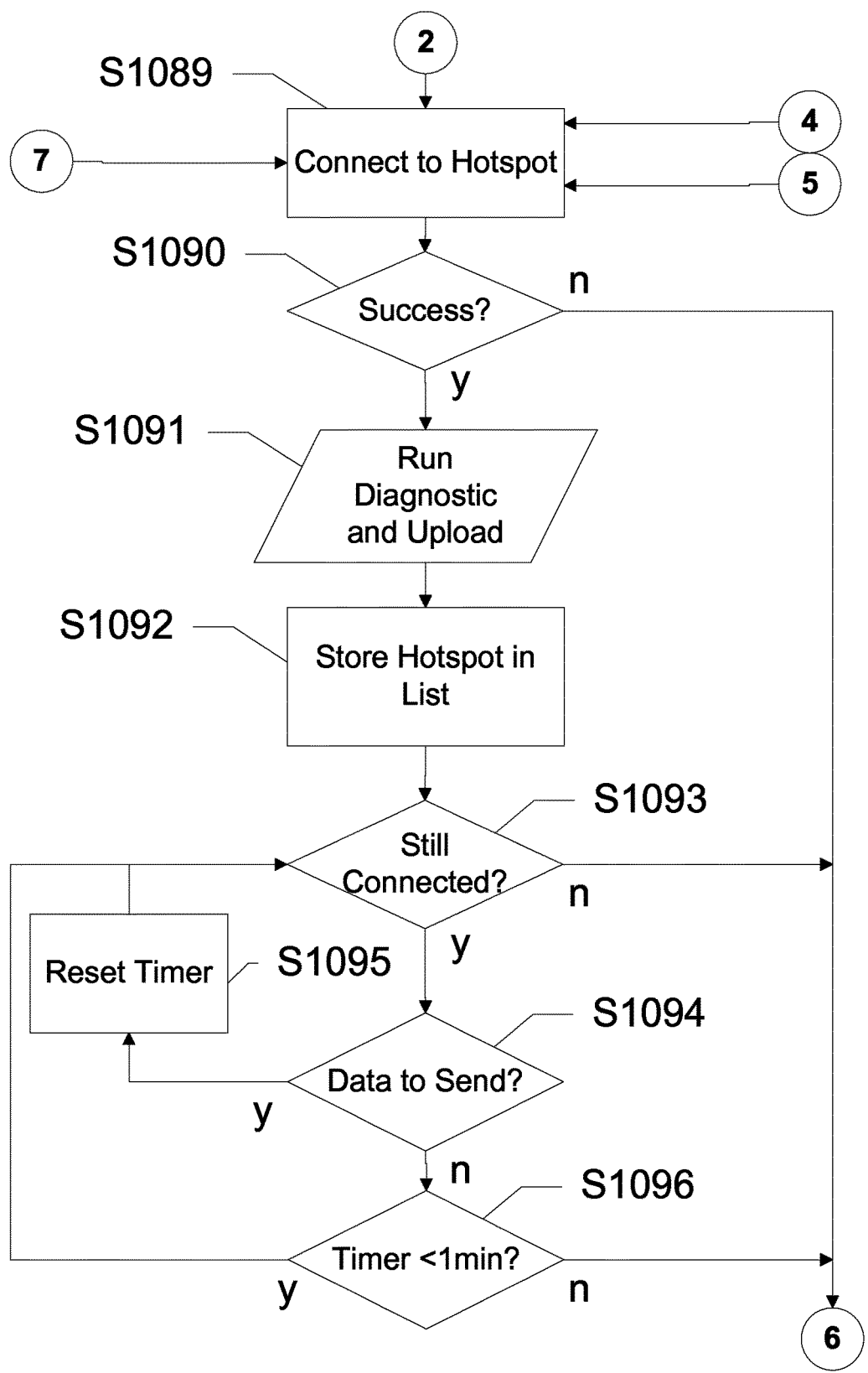
FIG. 10 shows a common connect and store mode of a mobile device, according to an exemplary embodiment of the present invention.

FIG. 10 shows a common connect and store mode of a mobile device, according to an exemplary embodiment of the present invention. In this embodiment, Points 2, 5, and 7 proceed to connect to a access point S1089. The mobile device attempts to connect to the access points according to their priority. Provider access points may be preferred, followed by a ranked list of public or other access points. The mobile device then determines whether or not a connection was successful S1090. If the connection was not successful, the mobile device returns to start the normal scan and prompt mode at Point 6. If the connection is successful, the mobile device runs a diagnostic test and uploads the results to the cellular server S1091. This test may include measuring the average bytes per second of uploads and downloads, as measured over a ten second test for instance; testing the ping latency; reporting cell IDs seen; etc. With the information sent to the server, the mobile device stores the connected access point in the existing list S1092 and averages RF fingerprint values for the location with existing historical database values. If the access point connected does not exist in the list or database, the current access point is added to the list along with the other values collected. After the data is uploaded, the mobile device proceeds to check if the mobile device is still connected to the access point S1093. If the mobile device is not still connected, the mobile device returns to the start of the normal scan and prompt mode at Point 6. If the mobile device is still connected, the mobile device determines whether there is any data to send S1094, or if any high-data/high-bandwidth applications are active. If there isn't any data to send, the mobile device determines whether the timer has elapsed S1096. If the timer has elapsed, the mobile device returns to the start of the normal scan and prompt mode at Point 6. If the timer has not elapsed, the mobile device returns to determining whether it is still connected to the access point S1093. If there is data to send, the timer is reset S1095 and the device determines whether it is still connected to the access point S1093.

Figure 11:
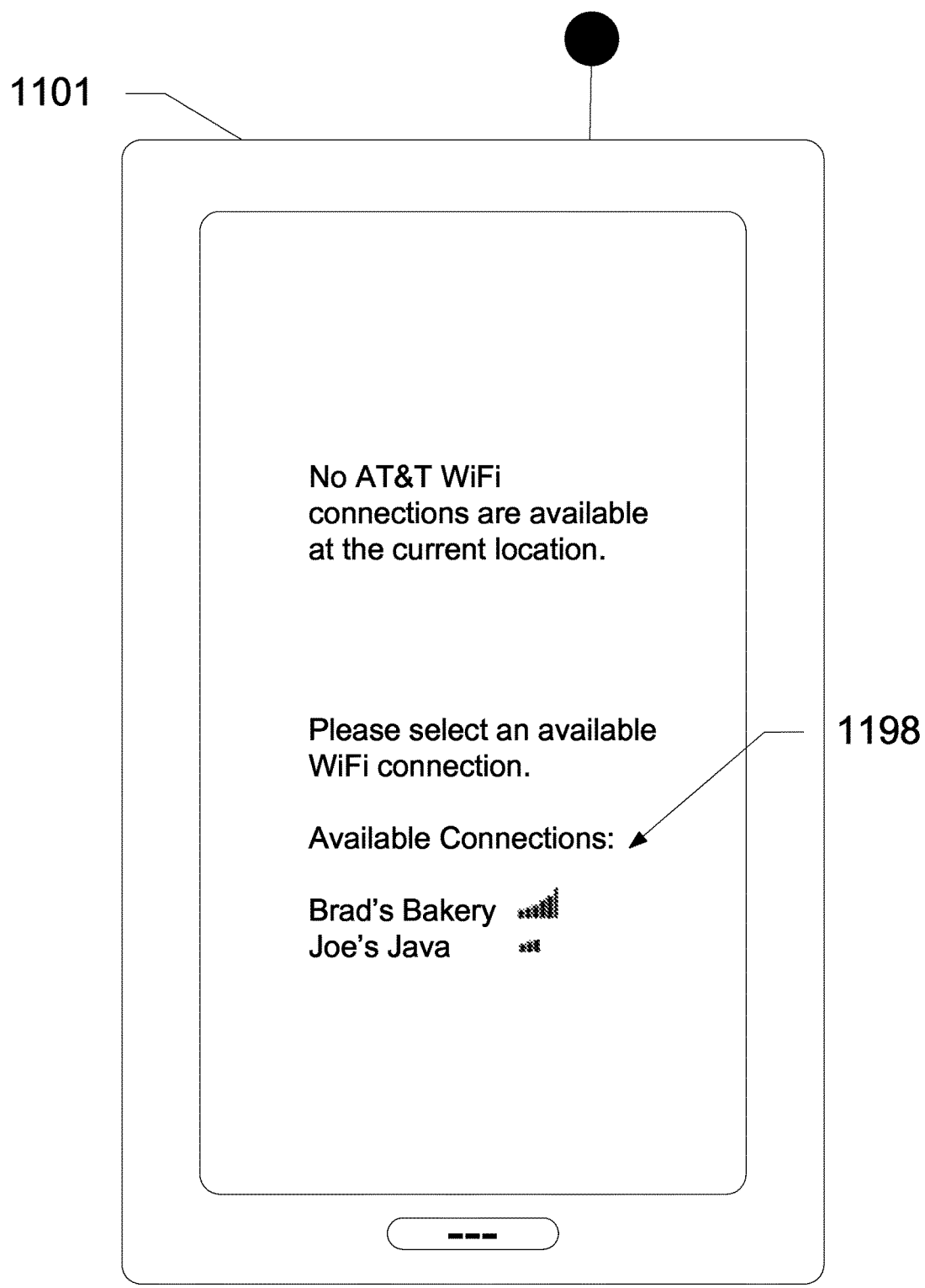
FIG. 11 shows a screenshot of a user prompt on a mobile device, according to an exemplary embodiment of the present invention.

FIG. 11 shows a screenshot of a user prompt on a mobile device 1101, according to an exemplary embodiment of the present invention. In this embodiment, the user is prompted when a connection to one of the service provider's preferred WiFi networks is not available. The user is able to select from available WiFi networks which have been detected by the mobile device. For instance, in this example, a connection to an AT&T WiFi network is not available and the user is prompted to select from the list of connections including Brad's Bakery and Joe's Java. Each of the available WiFi connections may include a signal strength for the connection as well as any security settings, etc. The prompt on mobile device 1101 may be presented when any access point is detected, only when unlicensed or public access points are detected, or can be listed based on any criteria defined by the user or an operator.

Figure 12:
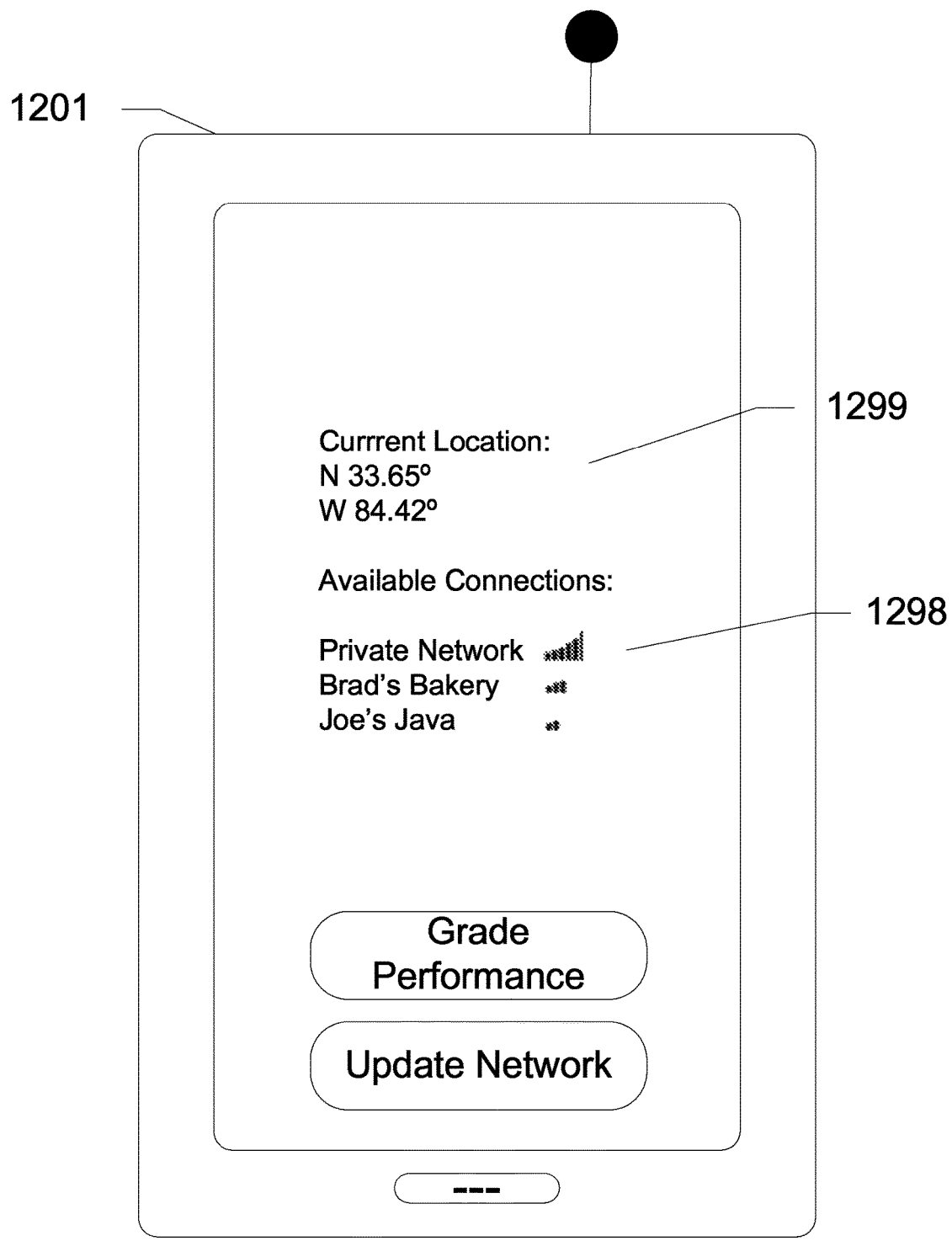
FIG. 12 shows an application on a mobile device for updating a network, according to an exemplary embodiment of the present invention.

FIG. 12 shows an application for updating a network on a mobile device 1201, according to an exemplary embodiment of the present invention. In this embodiment, the user updates a cellular network as to WiFi networks that are available at a location 1299 of the mobile device. For instance, at the user's current location 1299, available connections 1298 are private network, Brad's Bakery, and Joe's Java. The user may hit an update network button in order to notify the cellular network that these connections are available at the location. This location may be determined by the mobile device using GPS, through triangulation in the network, using an RF fingerprint, etc. The user may further select a network from the list and grade the performance of the network. This will measure attributes of the access point, such as signal strength, bandwidth, availability, etc. The user can again select the update network button to send this information to the cellular network.

Figure 13A:
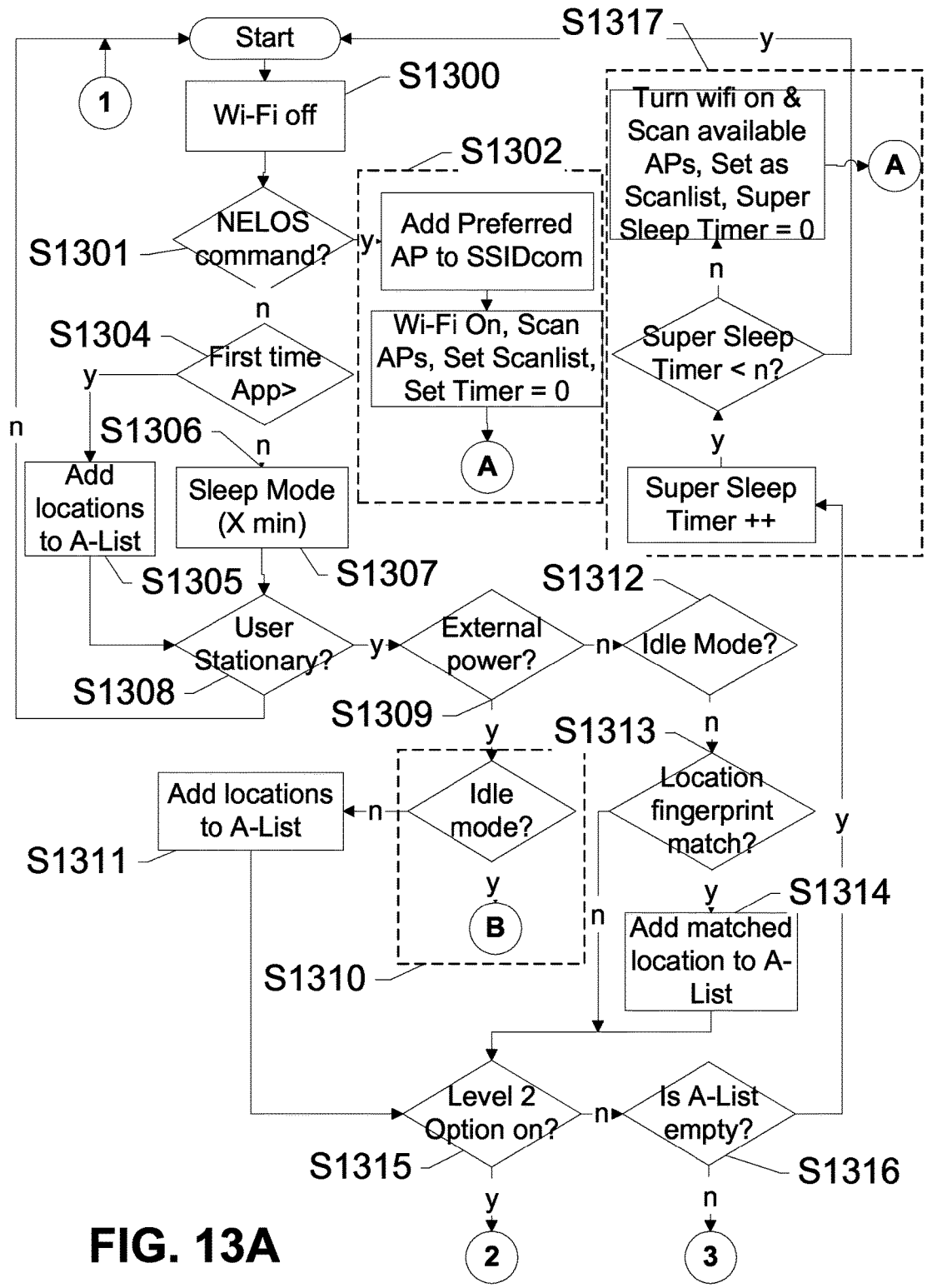
FIGS. 13A-13B show a main module of a method for selecting an access point, according to an exemplary embodiment of the present invention.
Figure 13B:
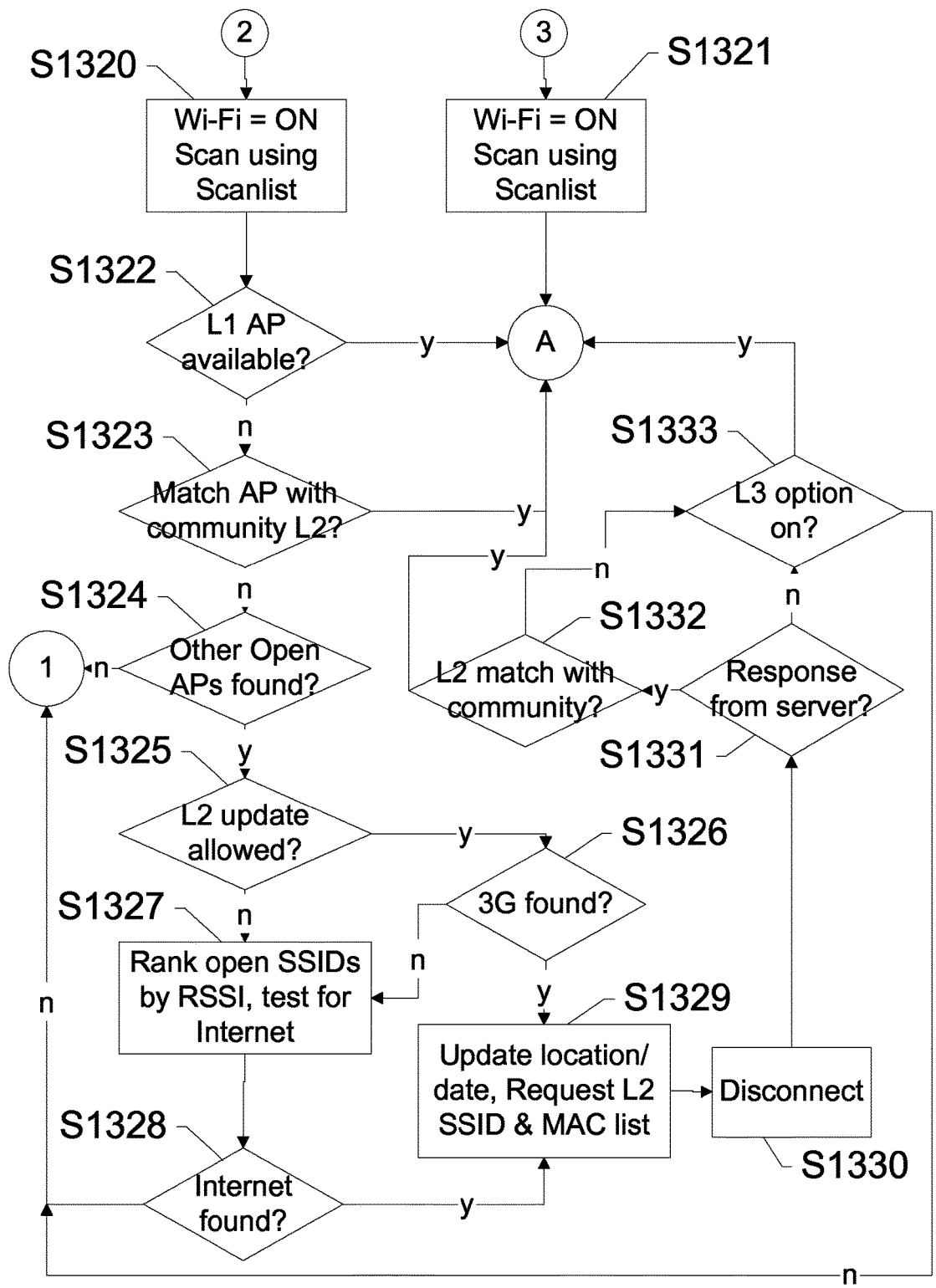
Figure 14A:
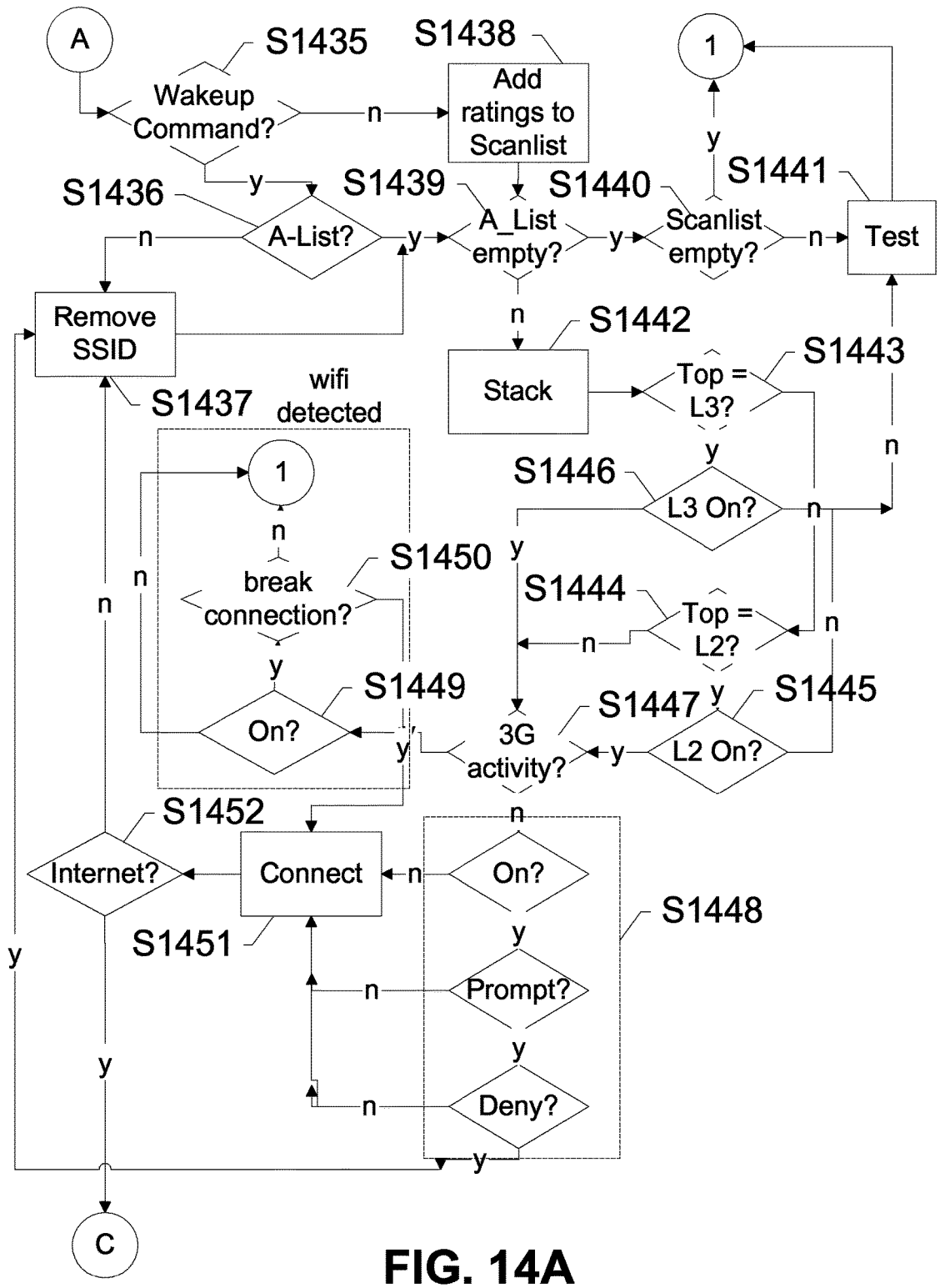
FIGS. 14A-14B show a method to rank and connect to ranked access points, according to an exemplary embodiment of the present invention.
Figure 14B:
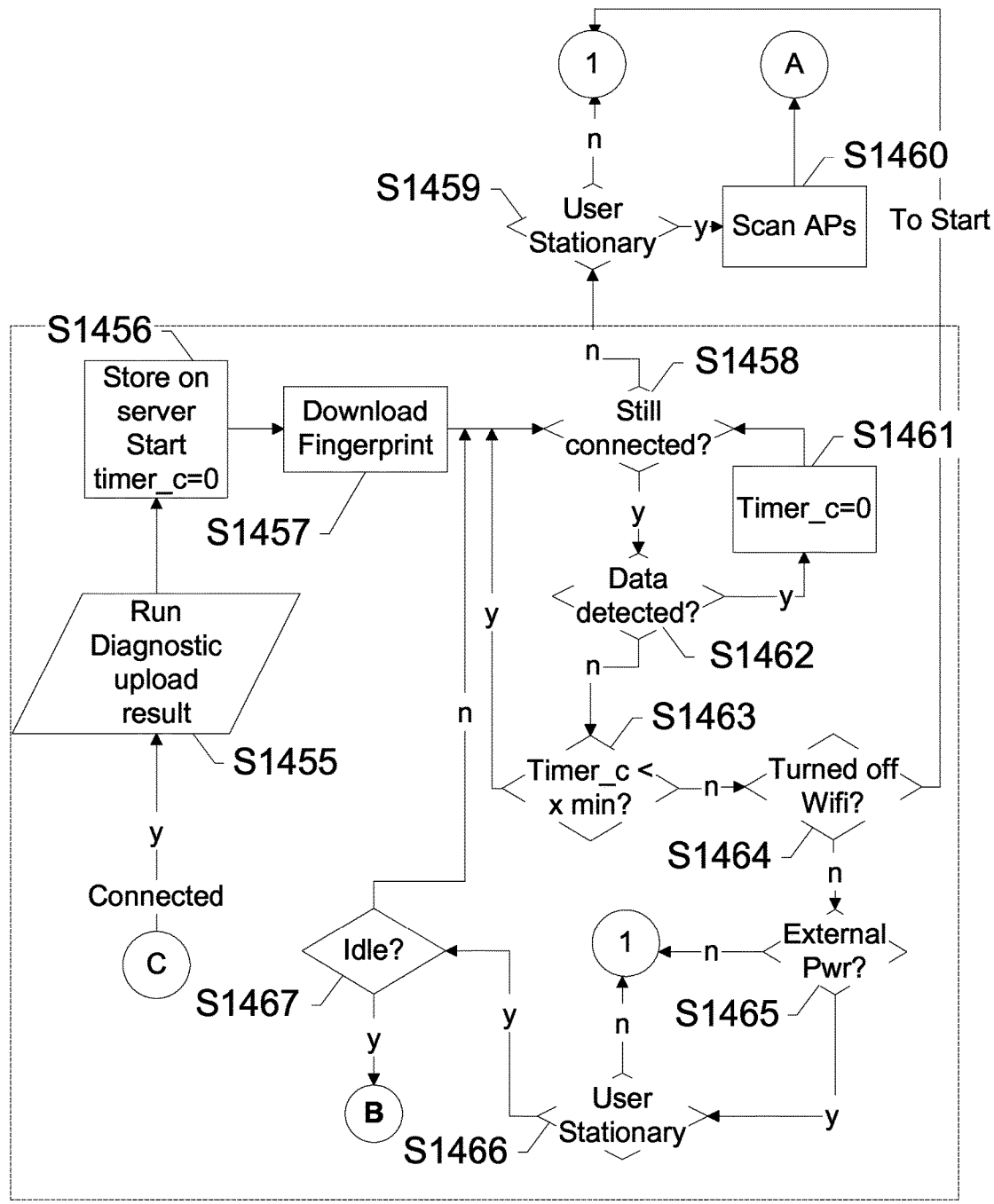
Figure 15:
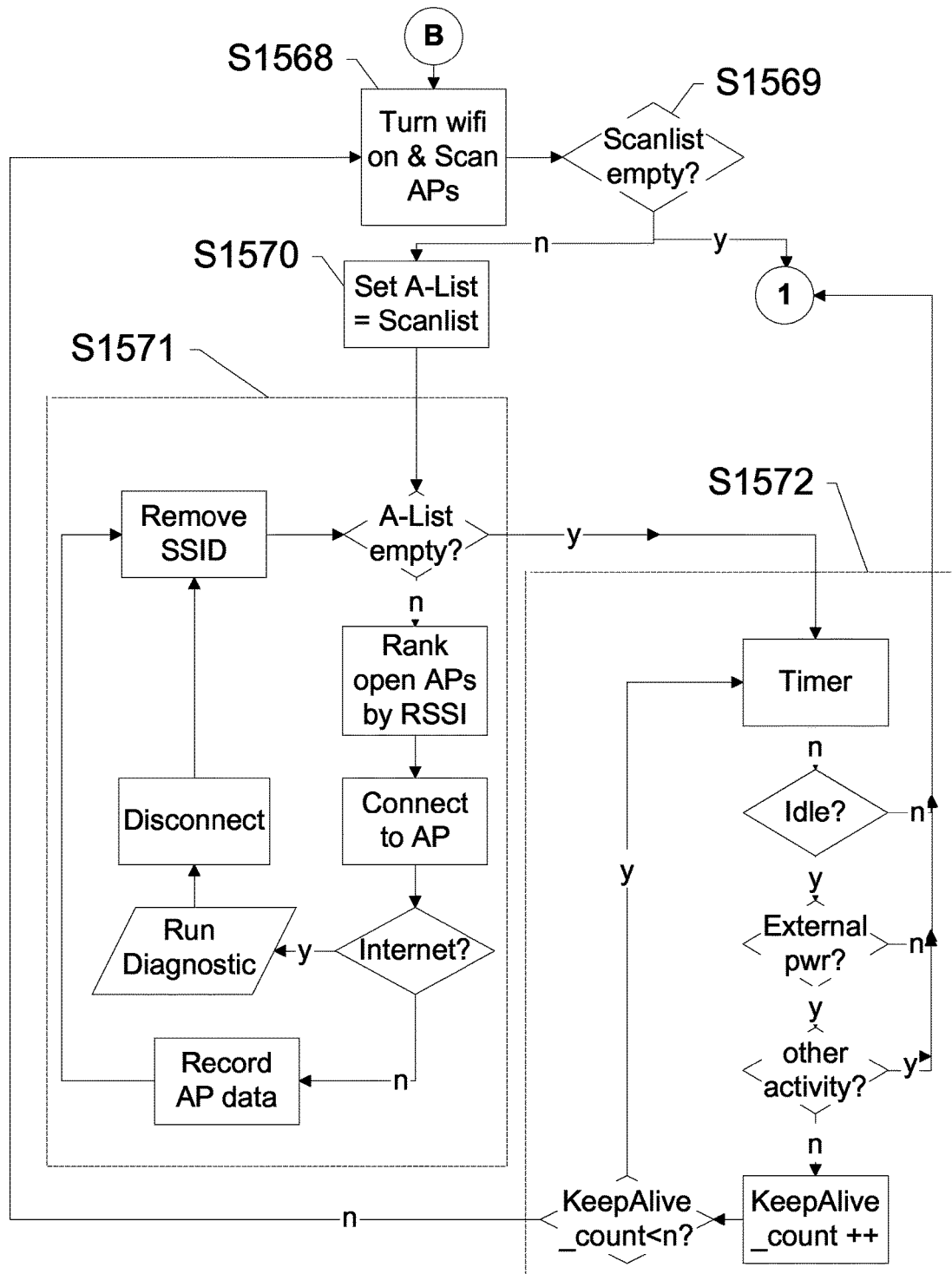
FIG. 15 shows a method for testing an access point, according to an exemplary embodiment of the present invention.
Figure 16:
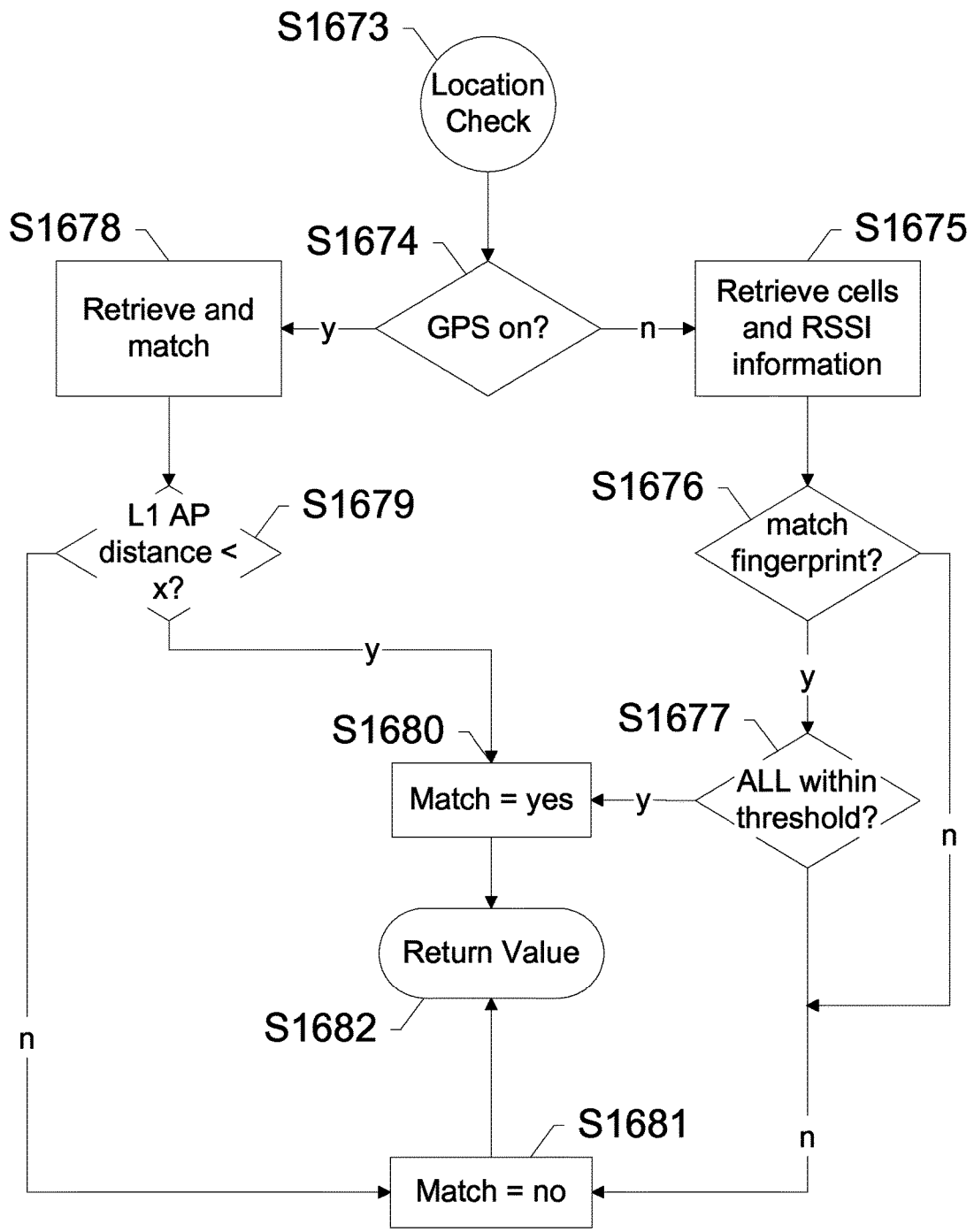
FIG. 16 shows a method to check a location and determine whether access points are nearby, according to an exemplary embodiment of the present invention.
Figure 17A:
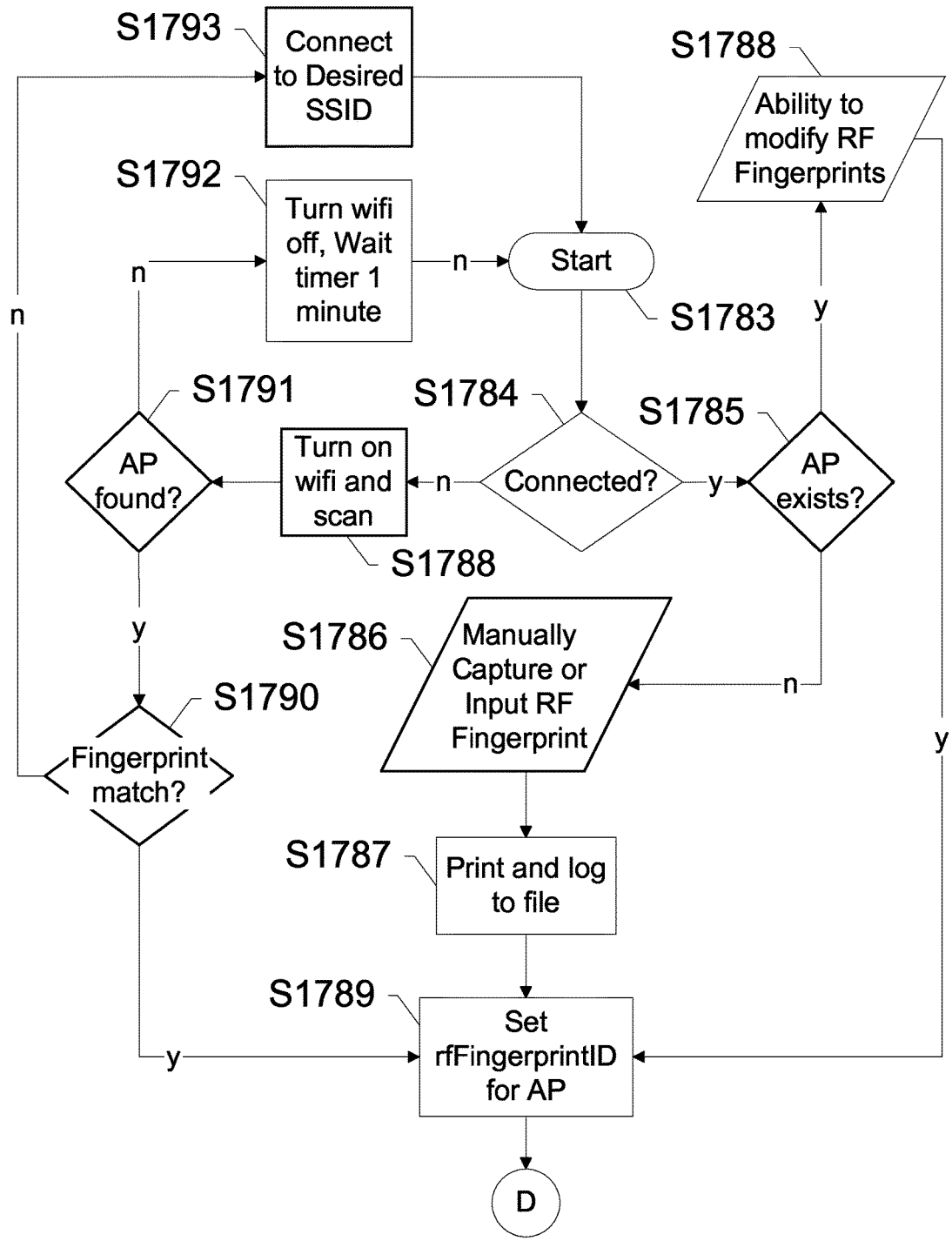
FIGS. 17A-17B show methods for testing and reporting an RF fingerprint for an access point, according to an exemplary embodiment of the present invention.
Figure 17B:
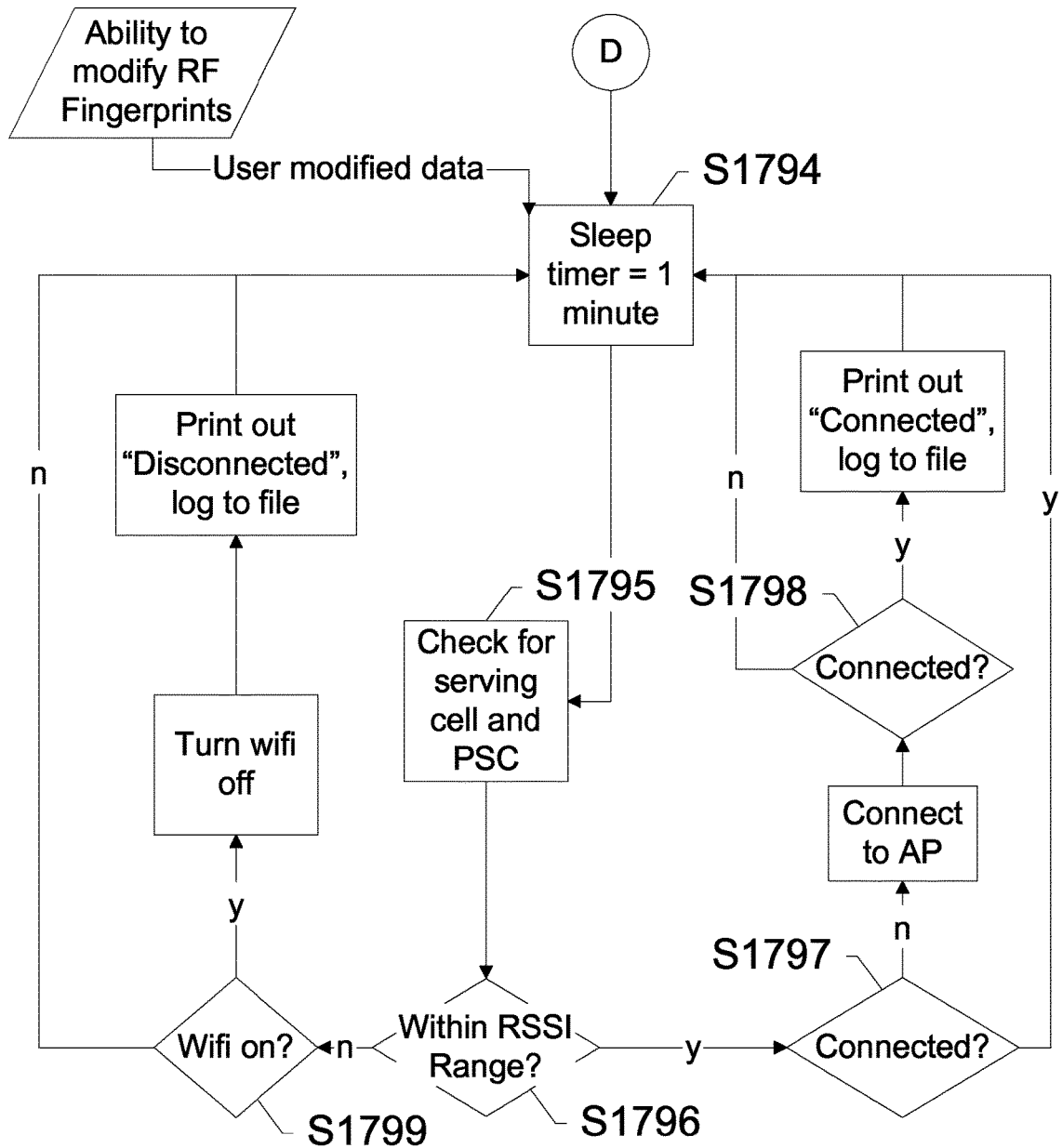

Now, exemplary methods of the Wi-Fi access point selection, including fingerprinting and commands between the network and a mobile device, will be described with respect to FIGS. 13-17. FIGS. 13A-13B describe a main module that determines a program flow. FIGS. 14A-14B describe a Connect Mode that ranks access points, tests for user connect level, and prompts a user to connect. FIG. 15 describes a super-cycle test mode that is activated when a mobile device is on external power and in an idle mode (i.e. when the screen is blank), and processor is idle indicating no activity. FIG. 16 describes a location check routine that uses GPS or an RF fingerprint to determine if an access point (AP) is within the vicinity of the mobile device. FIGS. 17A-17B describe an RF fingerprint test application having the ability to capture and modify RF fingerprints, and to connect and disconnect access points using the RF fingerprint.

With respect to FIG. 13A, the exemplary method begins with the Wi-Fi transceiver of the mobile device in an off state S1300. Step S1301 determines whether or not the NELOS method S1302 is invoked to activate the Wi-Fi transceiver. If yes, then the preferred access point (AP) as delivered by the NELOS server is populated within the field SSIDcom, the Wi-Fi transceiver is switched on or activated, a timer is reset, and the method moves to A, which is the beginning of the flowchart of FIGS. 14A-14B. If, however, there is no NELOS command, then it is determined if the application is running for the first time S1304. If yes, then a first list of locations is generated and added to a list S1305. If no, then it is assumed that the list already exists, and a sleep mode is activated S1307 for a specified duration. Then, a determination S1308 is made whether the mobile device is substantially in a stationary position. This can be determined by monitoring the movement of the device via GPS, etc. and if the speed is less than a threshold, then the mobile device is stationary. If not, then the method restarts.

If the mobile device is substantially still, then it is determined S1309 whether or not an external power source is present, such as a wall-charger or car charger, etc. If yes, step 1310 makes an idle-mode determination (i.e. if the screen in blank and/or if the processor is in a low-power state), and if yes, the method continues S1310 to the super-cycle test mode of FIG. 15. If there is no external power and the device is in an idle mode as determined in step S1312, the method restarts. If the device is not in idle mode, in step S1313 a fingerprint of the RF environment is measured, and compared to the list of locations (see FIG. 16). If there is a match, in step S1314 the matched location is added to the list. If there is no match, the method continues to determine if a second list is desired to be populated or accessed, such as the community list (L2) in step S1315. On the other hand, if the method If the device has external power but is not in an idle mode, at step S1311 locations are populated within the list, and a determination is made whether there is an option to populate a secondary list (L2) in step S1315. If yes, the method continues to step S1320 of FIG. 13B. If no, at step S1316 a determination is made as to whether the list of locations is completely empty. If yes, then a super sleep portion S1317 is activated, whereby a time is incremented, compared with a threshold value n, and so long as the timer is below n, the Wi-Fi transceiver is switched on, a list of available APs is determined, and the method moves to A, i.e. the connect mode of FIGS. 14A-14B. If the timer expires, the method restarts.

Meanwhile, FIG. 13B describes the method wherein the Wi-Fi is switched on, beginning at points 2 and 3 that respectively connect to steps S1315 and S1316 of FIG. 13A. At step S1320, the Wi-Fi transceiver is switched on and the area is scanned using a list of access points to be scanned. If an AP from the location list is available as determined in S1322, the method continues to A (FIG. 14). Similarly, at S1321, Wi-Fi is activated and the method continues to A. At step S1323, with no access points in L1 being available, available APs are compared to a community list L2. The community list can be generated by reports from other mobile devices, i.e. the crowdsourcing described earlier. If a match is found with the L2 list, the method continues to A. If no match is found, then a determination is made as to whether any other APs are found in S1324. If no APs are found at all, the method goes back to 1, i.e. the beginning of the flow chart in FIG. 13A. If open/accessible APs are found, then S1325 checks to see if the L2 list can be populated with the new AP, i.e. crowdsourcing. If yes, and if a 3G network is available S1326, then in S1329 a location, date, etc. for the AP are updated along with an SSID and MAC address in list L2. If L2 is not able to be updated, either in steps S1325 or because of lack of 3G in step S1326, any open APs are ranked by a received signal strength indicator (RSSI) and tested to see if the AP offers internet connectivity in step S1327. If Internet access is not available S1328, then the method goes back to step 1. If internet is available, then the AP is used to perform S1329, and disconnected in step S1330. At this point a response from an application server or other server on the network is monitored S1331. If a match is found with L2 in S1332, the method moves to the connection portion A (FIG. 14). If no match is found, a third list L3 option is invoked S1333. If the third list does not exist or is inaccessible for some reason, the method goes back to step 1. If the third list exists, the method moves on to connect with A.

FIG. 14A begins the connect mode of the exemplary method of the present invention. S1435 determines if a NELOS wake-up command has been received. If not, then the mobile device's ratings of the AP as determined from lists L1, L2, and L3 are added to a default scanlist S1438, and an A-list is populated as the scan list. If both the A-list and the scanlist still end up empty, or inaccessible/locked for some reason, the method goes back to step 1. If the A-list is empty S1439 but the scan list is not empty, then a test is performed S1441, the test including a test of the top 5 open APs for internet connectivity, and the successful ones are added to the list, and the method goes back to step 1 of FIG. 13A. If S1439 shows that the A-list is not empty, S1442 stacks and ranks the APs in the A-list based on the level of the list (L1, L2, L3), RSSI groups, and the rating as determined by the ranking logic on the mobile device or the server. Steps S1443-S1445 determine lists L2 and L3 are enabled and if the top AP is in one of these lists. If the AP is on the list but the list is not enabled, the method restarts at 1. If the APs are on the list and the lists are enabled, or if neither L2 nor L3 APs are on the list, the method continues to S1447 where the presence of data activity, i.e. an open 3G connection, is detected. This can include the detection of large amounts of data, for instance by using a threshold data transfer rate. If no 3G activity is detected, user prompt S1448 is initiated whereby if the prompt is enabled, a user is prompted to switch over to the top-ranked AP. If denied, the AP is removed from the list S1437, and the method goes back to the A-list determination S1439. If the user accepts, or if prompting S1448 is disabled, the method connects to the AP S1451. If internet access is provided as determined in S1452, the method goes to the fingerprint portion of the method, as linked using the connector C to the flowchart of FIG. 14B. If, however, internet connectivity is not present, the SSID of the access point is removed S1437 and the A-list determination is resume S1439. In addition, if 3G activity in S1447 exists, the method goes to a user prompt to break connection, if enabled, as determined in S1449. This is a prompt for the user to stop the process otherwise it will continue automatically. If the connection is broken S1450, the method returns to the first step of FIG. 13A. If not, then the AP is connected to S1451.

FIG. 14B shows the process of providing an RF fingerprint that operates when the mobile device is finally connected to the AP. Starting with the connector C, step S1455 begins the fingerprint diagnostic procedure and uploads a result to the server. S1456 stores the diagnostic result on the server, as averaged with previous RF fingerprints submitted in the past, and begins a timer, as indicated by timer_c. The fingerprint is downloaded S1458 and stored on the L1 list on the phone. If the connection is broken or times out, and if the user is not stationary (i.e. moving) S1459, the method restarts at step 1. If the connection is terminated or times out, and if the user is stationary, the APs in the vicinity are scanned, and the connection process restarts at step A. If the connection is maintained S1458, the method detects a data flow S1462. If there is no data flow, the timer is compared to a threshold S1463, and if the timer is within the threshold, the data and timer monitoring continues. If there is data flow, the data flow is monitored until it stops. If, however, there is no data flow and the timer reaches the threshold, the method checks if the wi-fi transceiver is still active S1464. If inactive, the method restarts at step 1. If the wi-fi transceiver is active, but if there is no external power source S1465, the method restarts. If there is external power but if the user/mobile device is in motion S1466, the method restarts. If the user is stationary, and if the device is not in an idle state S1467, the method goes back to step S1458, initiating the connection, data, and timer loop. If, however, the device becomes idle, then the method connects via connector B to the super-cycle test mode of FIG. 15.

FIG. 15 shows a super-cycle test mode of an AP list. At S1568, APs in the vicinity are scanned. If the list is empty S1569, the method returns to step 1 of FIG. 13A. However if the list is not empty, then A-list is populated with the results of the scan list S1570. If the A-list returns empty, a timer is initiated, a keep-alive timer S1572 is initiated, whereby if the mobile device remains not-idle (i.e. fully powered up), is on external power, and there is no other application using the data connection, then the timer is incremented until it reaches a threshold n. Once it reaches the threshold, the method loops back to step S1568 to scan APs. If APs are found and A-list becomes populated in S1571, the super-cycle test loop is initiated, whereby any open APs are ranked by RSSI, internet connectivity is tested, the diagnostic portion of FIG. 14B is executed (and results saved or reported to a server), and then disconnected. This method is looped until the scan list turns up empty in which case the method returns to the first step 1.

FIG. 16 shows a location check routine, according to an exemplary embodiment of the present invention (see step S1313 of FIG. 13A). In this embodiment, a mobile device and/or a network uses GPS or an RF Fingerprint to determine whether a specific access point is in the vicinity of the mobile device. The routine begins with an initiation of a location check S1673. It is determined whether the mobile device's GPS is on S1674. This may be accomplished by the mobile device and reported to the network. If the GPS is on, the mobile device determines the latitude and longitude of the mobile device's current location and the mobile device and/or the network matches these coordinates to the location of, for instance, the L1 access point S1678. It is then determined if the distance between the mobile device and the L1 access point is less than a pre-determined distance S1679. If the distance is less than the pre-determined distance, there is a match S1680 and this value is returned S1682. A match is an access point that is available and/or in range at the current location of the mobile device. If the distance is not less than the pre-determined distance, there is not a match S1681, and this non-match value is returned S1682. If the GPS is not on, the mobile device retrieves serving cell, neighbor cells, and received signal strength indication (RSSI) information S1675. It is determined whether any of the serving cell or neighbor cells match any of the RF Fingerprints for the specific access point S1676. If there is an RF Fingerprint match, it is determined whether all of the RSSI information is within a given threshold S1677. If the RSSI information is within the threshold, there is a match S1680 and this value is returned S1682. If there is not an RF Fingerprint match or all of the RSSI information is not within the threshold, there is not a match S1681, and this value is returned S1682.

FIGS. 17A and 17B describe an RF fingerprint test application having the ability to capture and modify RF fingerprints, and to connect and disconnect access points using the RF fingerprint. As seen in FIG. 17A, the method starts S1783 and it is determined whether a mobile device is connected to an access point S1784. If the mobile device is connected, it is determined whether an RF Fingerprint for the SSID exists S1785. If the RF Fingerprint exists, the application is able to modify the RF Fingerprint for the SSID S1788. This modification may include modifying the CellID, PSC's, RSSI range, etc. The RF Fingerprint ID is then set for the SSID S1789. If an RF Fingerprint for the SSID does not exist, the mobile device manually captures or inputs an RF Fingerprint for the SSID S1786. A sample RF fingerprint is shown below:
RF fingerprint for SSID=Linksys
PSC1=105, RSSI1=−75
PSC2=106, RSSI2=−80
PSC3=−100, RSSI3=−90

The mobile device captures for instance, the fingerprint found, the SSID, the Cell ID, the PSC, the RSSI's range and logs this information S1787. The RF Fingerprint ID is then set for the SSID S1789. If the mobile device is not connected to an access point, the mobile device turns on the WiFi transceiver and scans for an access point S1788. It is then determined whether any access point is found S1791. If no access points are found, the WiFi transceiver is turned off for a period set by a timer, for instance, one minute S1792, and the method starts, over S1783. If an access point is found, it is determined whether there is an RF Fingerprint match S1790. If there is an RF Fingerprint match, the RF Fingerprint ID is set for the access point S1789. If there is not an RF Fingerprint match, the mobile device connects to a desired SSID S1793 and the method starts again S1783. With the RF Fingerprint ID set for the access point, the method advances to connector D which leads to FIG. 17B.

Referring now to FIG. 17B, a sleep timer S1794 is set for a period, for instance, for one minute. After the sleep period, S1795 checks for a serving cell and an associated PSC by referring to a neighbor list. An example of values falling within a range are:
PSC1=105, RSSI1=−80
PSC2=106, RSSI2=−78
PSC3=56, RSSI3=−50

An example of values not falling within the range are:
PSC1=105, RSSI1=−80
PSC2=106, RSSI2=−90
PSC3=56, RSSI3=−50

If the cell and PSC values are detected to within a range of the RSSI for the AP, a connection is checked S1797. The wi-fi transceiver is activated and connects to the particular AP. If the detected values are not within the RSSI range, the wi-fi transceiver is monitored S1799, and switched off if needed. In both cases a log file is populated with the result in the form of a report, i.e. "disconnected" or "connected."

The above flow-charts show merely an exemplary method for implementing the novel features of the present invention. Similarly, the screenshots shown below in FIGS. 18-24 are sample user interfaces and the present invention is not limited to just these embodiments. Variations and modifications will be apparent to a person having ordinary skill in the art upon reading this disclosure, and may be necessary to implement the present invention on different platforms and devices.

Figure 18:
FIG. 18 shows an initial setup menu for intelligent selection of an access point, according to an exemplary embodiment of the present invention.

FIG. 18 shows an initial setup menu 1860 for intelligent selection of an access point, according to an exemplary embodiment of the present invention. In this embodiment, setup menu 1860 includes a menu bar 1862, a menu 1863, and initial tips 1861 with a skip feature. Menu bar 1862 may pulse to indicate to the user that the user should tap menu bar 1862. When the user taps menu bar 1862, menu 1863 slides up from menu bar 1862. As menu 1863 slides up, menu bar 1862 may concurrently slide down such that menu 1863 has a larger viewable portion. Menu 1863 may include options including scan, find, "My Spots", manage, and tips. These options assist the user in setting up a connection to an access point. The scan option commands the mobile device to scan for available access points in the area. The find option allows the user to find a certain access point. This may be finding an access point the user has connected to before, finding an access point approved or provided by a service provider, etc. My Spots lists all the access points the user has connected to manually, all access points of the service provider, as well as any access points automatically added by a ratings application. This ratings application may rate available access points to determine ideal access points. This rating may include signal strength, security, number of other users, etc. The manage option allows the user to manage connections to access points. Tips and initial tips 1861 both provide information for new users concerning selection of access points, settings, etc. For instance, a tip may be that the "My Spots" menu feature is where to find trusted access points, notifying the user that each time the user connects to an access point the user is able to add the access point to My Spots. The skip feature may be selected to skip over the initial setup. In addition to menu sliding up, next 1865 and back 1864 buttons may additionally appear to provide assistance in navigating initial setup menu. Initial setup menu may further include a pagination indicator 1866. Pagination indicator 1866 updates to reflect where the user is within the menu hierarchy. Pagination indicator 1866 may attach to the bottom of menu 1863 and slide up along with menu 1863.

Figure 19:
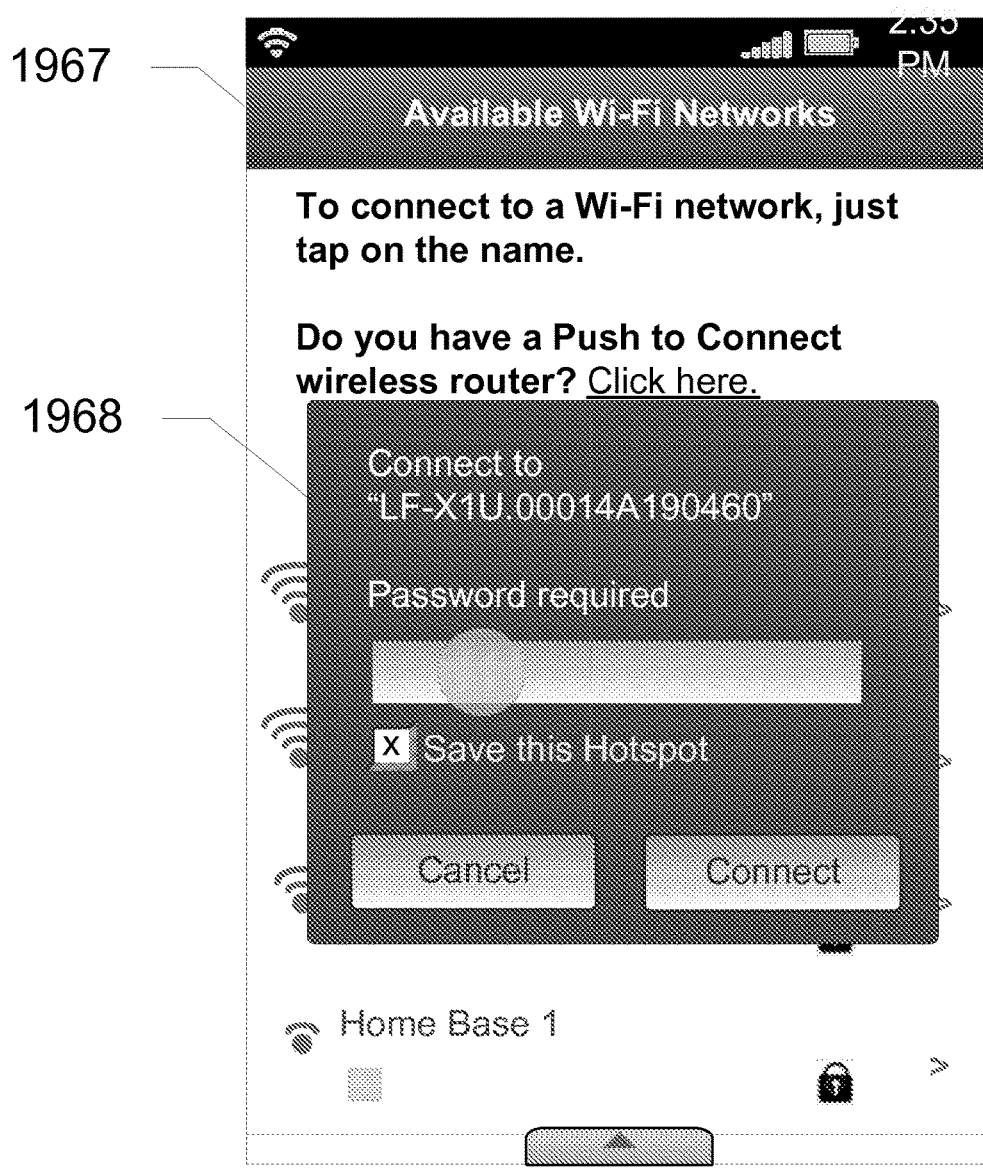
FIG. 19 shows a connection to a network requiring a password, according to an exemplary embodiment of the present invention.

FIG. 19 shows a connection to a network requiring a password, according to an exemplary embodiment of the present invention. In this embodiment, when a user has selected to connect to an access point from a list of available access points 1967, the access point having security features enabled, the user is given a prompt 1968 to enter the password for the access point. In touchscreen embodiments, the mobile device may then display a keypad for entering the password. The user may select to save the access point for future connections.

In a further embodiment of the invention, the user is prompted to choose whether the connection is a home connection, a work connection, etc. when first connecting to a network. Different settings for the connection may be based upon this selection.

Certain wireless routers may have a push to connect feature. The user may be provided with instructions for connecting with this feature. This may require the user to select an information button, etc.

Figure 20:
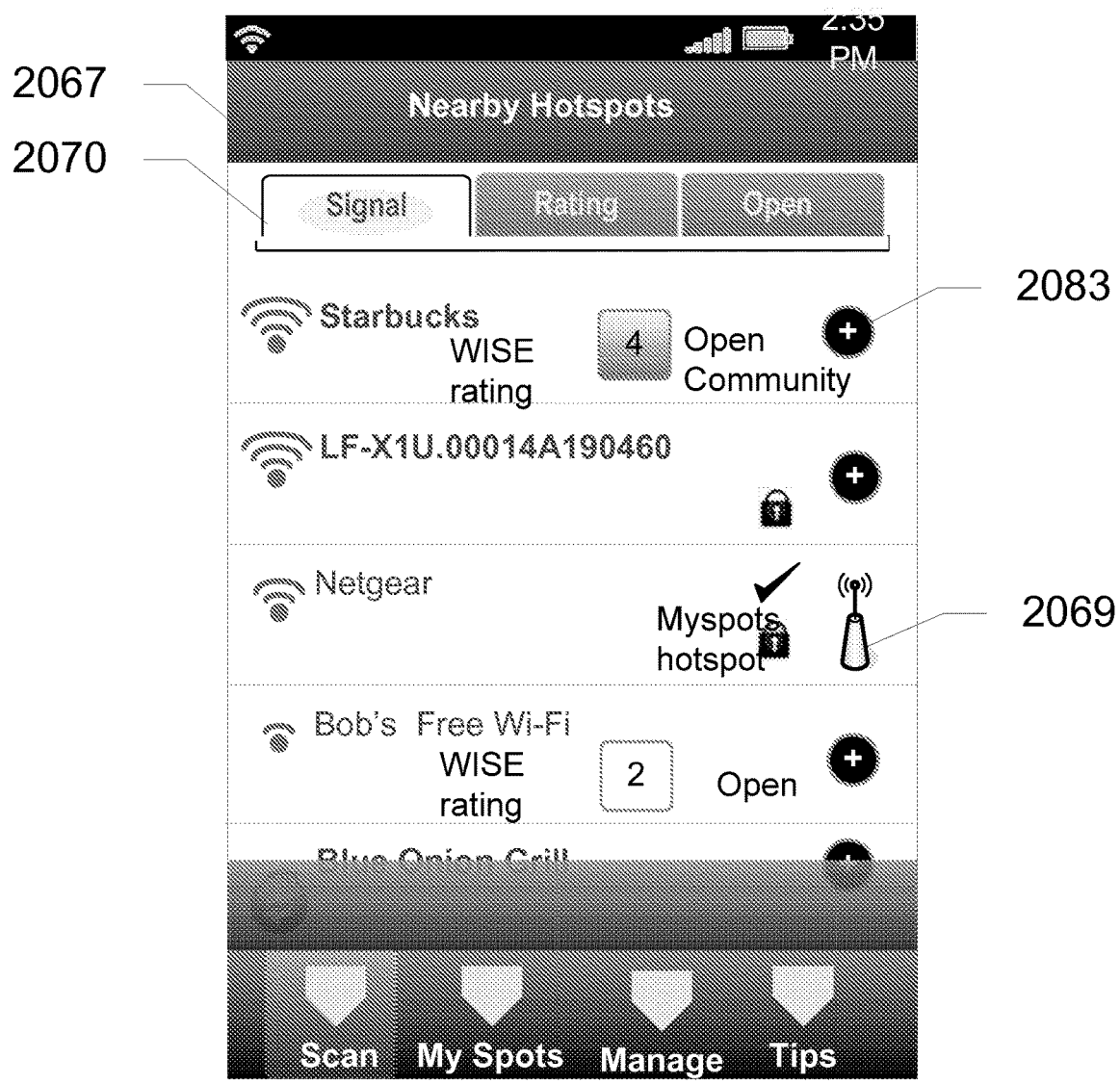
FIG. 20 shows the result of a scan for available access points, according to an exemplary embodiment of the present invention.

FIG. 20 shows the result of a scan for available access points, according to an exemplary embodiment of the present invention. In this embodiment, the scan results are presented to the user as a list of available access points 2067, for instance, by name, as well as their signal strength, rating, security settings, connectivity status, etc. List 2067 may be based on a real-time detection of visible access points. Optionally, an indicator 2069 may be used to reveal more detailed information about the access point, such as technical details or ratings, an address or owner, etc. List 2067 may be toggled between a list view and a map view showing a location of the access points. A refresh feature may allow for a manual refresh of the available access points by performing a new scan. The user may be able to select different tabs 2070 to sort the available access points. For instance, a signal tab sorts the available access points by their signal strength, a rating tab sorts the available access points by rating, and an open tab may sort the available access points by whether or not the access point requires a password. The user may select one of the available access points from the list to connect to the access point, such as by pressing or selecting a plus button 2083 for the access point.

When the user selects an access point that is not currently connected, the user may receive a connect screen based upon the lock state of the access point, the lock state being open or password protected. This connect screen may require the entry of the password for the access point, may allow the user to save the access point, etc. Saving the access point may add the access point to the My Spot list and the access point is treated as a trusted access point for future connections, such as auto-connect schemes. The user may then select to connect to the access point or cancel the connection attempt.

In embodiments of the invention, if WiFi is off upon the launch of the application, the user is prompted to turn on the WiFi. Once the user turns the WiFi on, the application may auto-connect or attempt to auto-connect to a network previously approved by the user.

Figure 21:
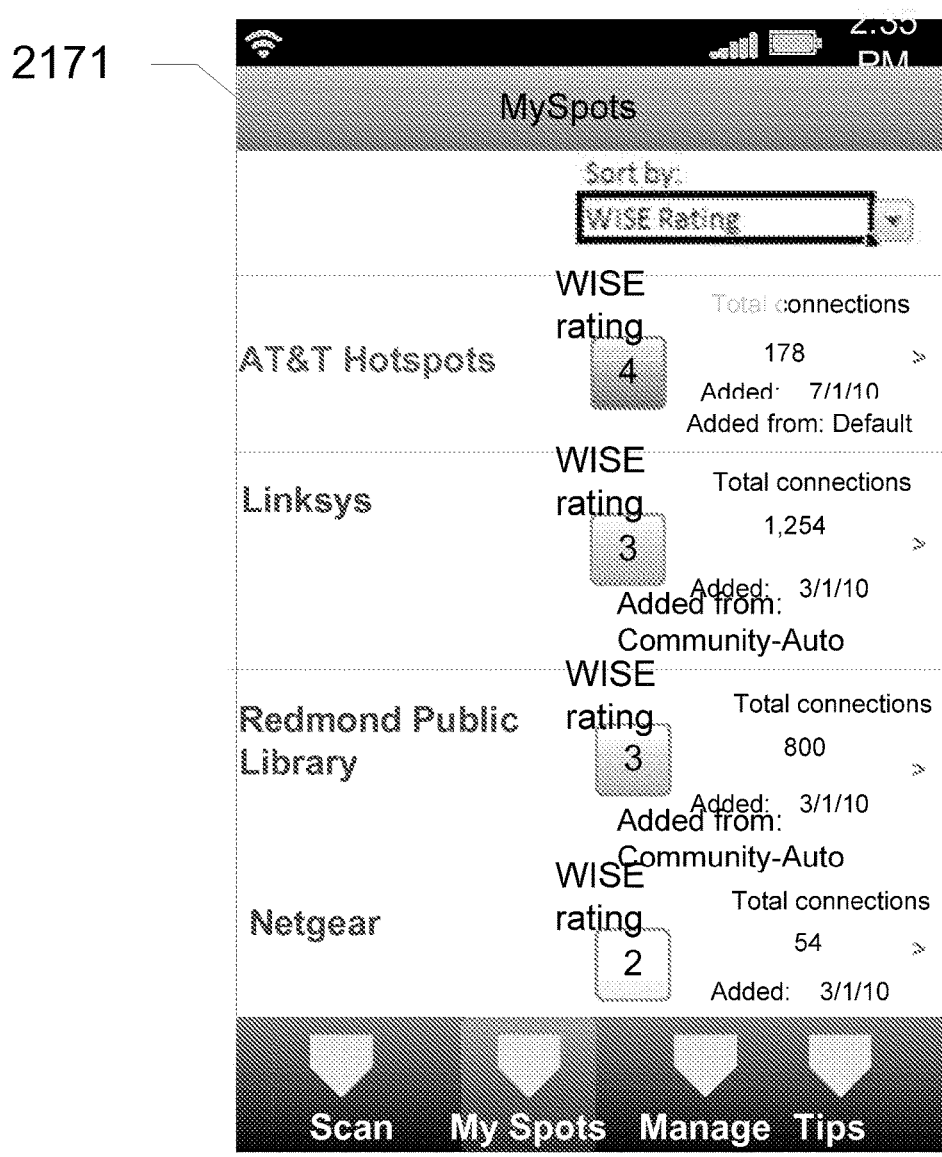
FIG. 21 shows a populated "My Spots" list, according to an exemplary embodiment of the present invention.

FIG. 21 shows a populated "My Spots" list 2171, according to an exemplary embodiment of the present invention. In this embodiment, list 2171 includes all access points the user has manually connected to, all service provider access points, and all access points automatically added by applications. The listing of each access point may include a rating, a number of times the user has connected to the access point, a date the access point was added, how the access point was added, etc. From list 2171, access points may be added, removed, edited, etc. List 2171 may be sorted by any of these variables.

Figure 22:
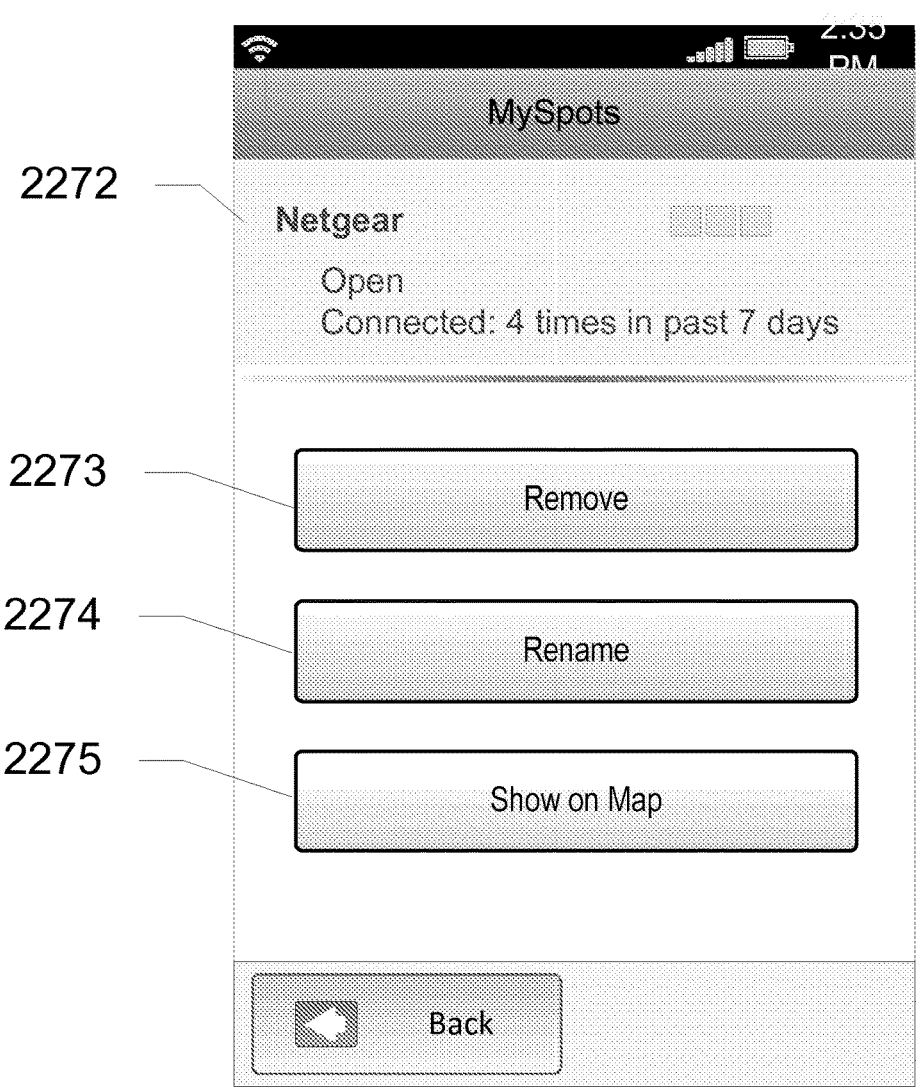
FIG. 22 shows options for a selected access point from a "My Spots" list, according to an exemplary embodiment of the present invention.

FIG. 22 shows options for a selected access point 2272 from a "My Spots" list, according to an exemplary embodiment of the present invention. In this embodiment, the user is provided with information concerning the access point. For example, in this embodiment, the user is provided with signal strength of the access point, the security of the access point, past connections, etc. The user may select to remove 2273 the access point from the My Spots list, may rename 2274 the access point, may show the access point on a map 2275, etc. Each of these options may open a further screen or prompt, such as a confirmation screen for removal of an access point, a prompt to rename the access point, a screen showing a location of the access point on a map, etc.

Figure 23:
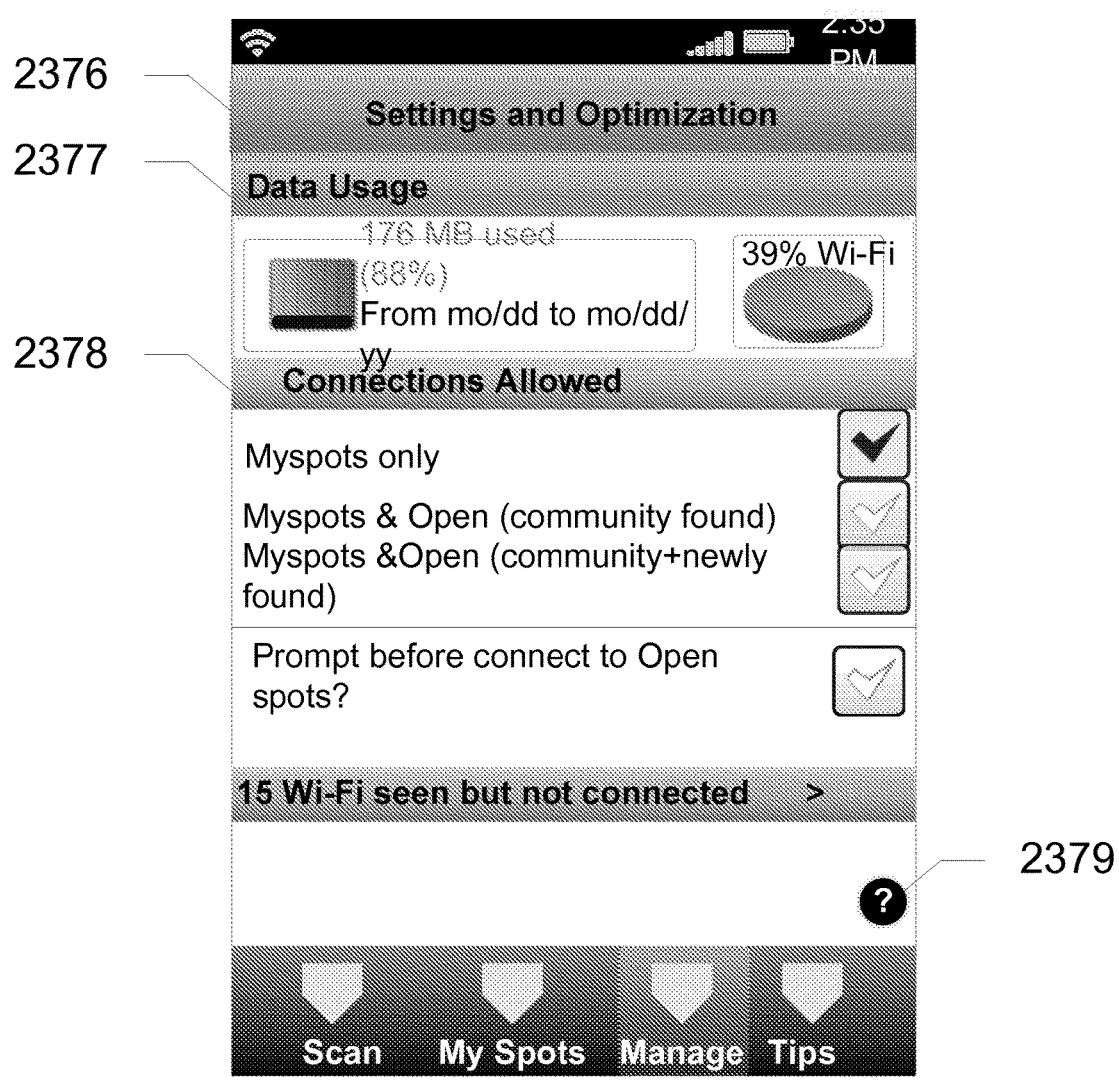
FIG. 23 shows settings and optimization for intelligent selection of an access point, according to an exemplary embodiment of the present invention.

FIG. 23 shows settings and optimization 2376 for intelligent selection of an access point, according to an exemplary embodiment of the present invention. Settings and optimization 2376 may provide the user with data regarding data usage 2377 and allow the user to allow or disallow certain connections with an allowed connections feature 2378. Data usage 2377 may include the amount of data used by the mobile device including a time period in which the data was used. Data usage 2377 may also include usage by type, such that the user may view the data used over a cellular connection versus an access point. In allowed connections 2378 the user may select to allow connections from the My Spots list only, the My Spots list and open connections, etc. The user may be prompted before automatically connecting to open connections not on the My Spots list. An information button 2379 reveals more information about a feature or features. Information button 2379 may open be a scrollable form that must be dismissed prior to the user being able to return to the originating page.

Figure 24:
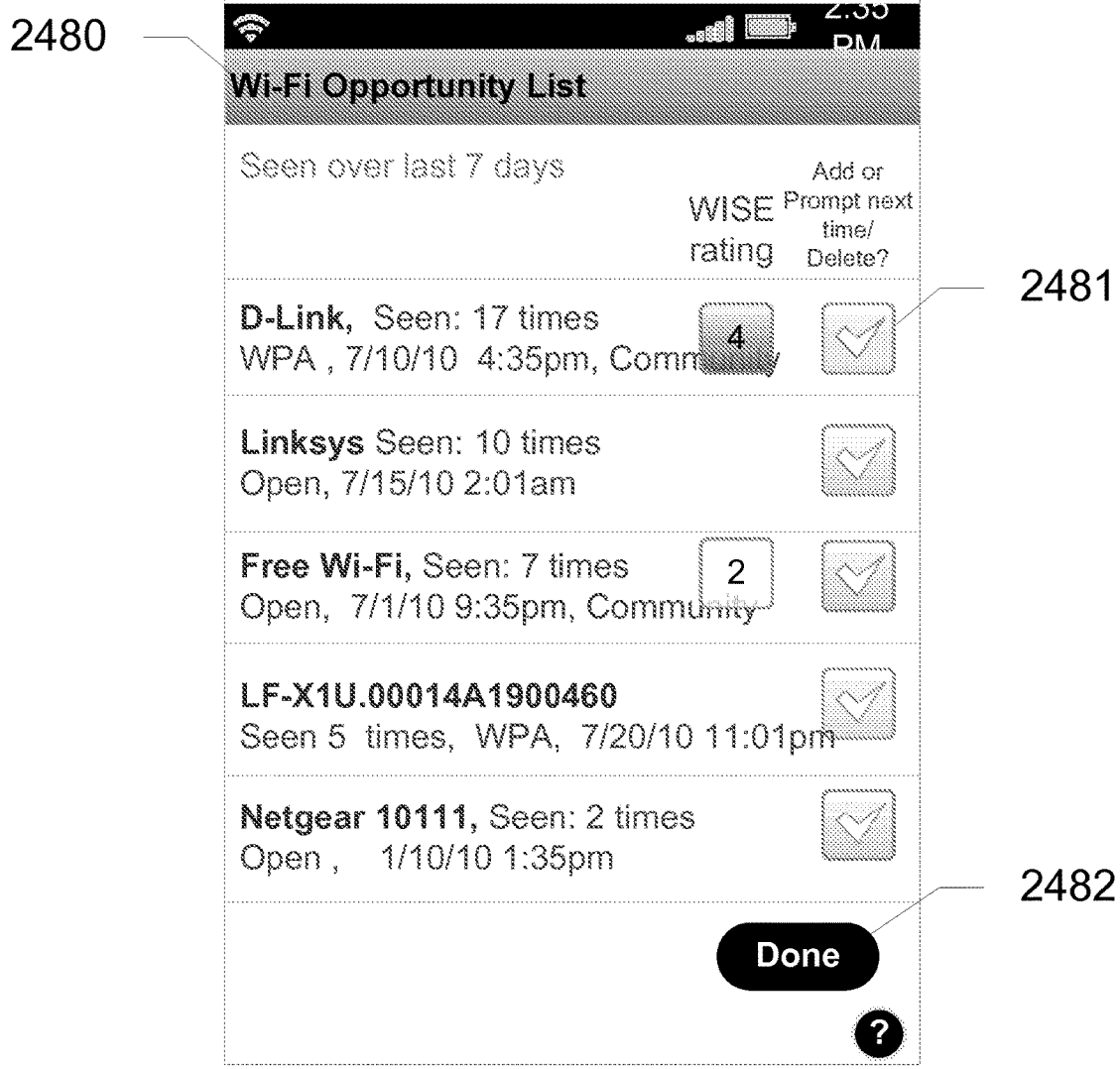
FIG. 24 shows an access point opportunity list, according to an exemplary embodiment of the present invention.

FIG. 24 shows an access point opportunity list 2480, according to an exemplary embodiment of the present invention. In this embodiment, access points which have been seen during a scan, but were not used or saved, may populate opportunity list 2480. Box 2481 may be selected by the user to add or ignore an access point. This allows the user to add access points to the My Spots list if desired or ignore certain access points such that the availability of ignored access points does not produce a prompt for the user. Opportunity list 2480 may include the number of times the access point has been seen during a scan, the security of the access point, the date and time the access point was seen, a rating, etc. After the user has made selections, the user may press done 2482 to execute the selections.

According to embodiments of the present invention, updating the cellular network may also send the network an RF fingerprint for the current location of the mobile device, this location being determined through GPS, etc. The cellular network can update databases on application servers with this new information to make further determinations of location more accurate, especially for devices lacking GPS capabilities. Further, the dynamic intelligence may take into account a subscriber density, or a number of subscribers per cell sector, and use this information to balance the load between cell towers and Wi-Fi or equivalent access points. High-throughput customers, or users with specific devices such as a PDA or iPAD, etc. may be shifted over to wireless local area networks, while general voice and text users can remain on the cellular network. A unique profile for each type of device can be stored on the network, with logic determining how to load-balance the network access based on device type. The logic can be on a server on the network, on the mobile devices themselves, and any combination thereof. Other combinations are possible and will be apparent to one skilled in the art in light of this disclosure.

The foregoing disclosure of the preferred embodiments of the present invention has been presented for purposes of illustration and description. It is not intended to be exhaustive or to limit the invention to the precise forms disclosed. For instance, although the majority of embodiments are described with access points being Wi-Fi access points, this is not necessary and equivalent or alternative means for connecting to packet-based networks such as the internet, IP Multimedia System (IMS), etc. are conceivable. The present invention can also be used to load balance between different types of cellular networks, such as 2G, 3G, WiMax, etc. Several variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method, comprising:
   determining, by a mobile device comprising a processor, speed information and direction of travel information for the mobile device based on current location information for the mobile device and past location information for the mobile device;
   determining, by the mobile device, future location information for the mobile device based on the speed information and direction of travel information;
   determining, by the mobile device, an access point device from access point devices based on location information for the access point devices and the future location information for the mobile device;
   overriding, by the mobile device, a setting of the mobile device related to transitioning a power state of a transceiver of the mobile device between an off state and an on state, wherein the setting is determined based on a user input, wherein the overriding the setting activates the transceiver of the mobile device, and wherein the overriding is in response to:
      receiving an instruction from equipment of a network operator that facilitates network load balancing via control of how many mobile devices, comprising the mobile device, are accessing a network device,
      determining that the transceiver is compatible with the access point device,
      determining that utilizing the access point device satisfies a condition relating to offloading data traffic from the network device, and
      determining that the mobile device is within a defined distance of the access point device; and
   initiating, by the mobile device, communication with the access point device.

2. The method of claim 1, wherein the determining the speed information and the direction of travel information is based on a current location and corresponding current time information determined from the current location information, and a past location and corresponding past time information determined from the past location information.

3. The method of claim 2, wherein the determining the future location information comprises determining information having a probable future location and a corresponding arrival time based on the speed information, the direction of travel information, and the current location.

4. The method of claim 2, wherein the determining the future location information comprises determining information having a probable future location and a corresponding arrival time based on navigation information relating to a path between the mobile device and the probable future location.

5. The method of claim 1, wherein the defined distance is a first defined distance, and wherein the determining the access point device comprises including access point devices that are within a second defined distance from a probable future location indicated in the future location information for the mobile device.

6. The method of claim 1, wherein the initiating the communication comprises initiating a connection to a femtocell access point device.

7. The method of claim 1, wherein the initiating the communication comprises initiating a connection to a Wi-Fi access point device.

8. The method of claim 1, wherein the activating the transceiver is further in response to a proximity being determined to satisfy a defined proximity condition, a time and a date being determined to satisfy a temporal condition, a schedule condition being determined to be satisfied related to an access point preference schedule determined from a configurable schedule of events, and the access point device being determined to be available for use.

9. The method of claim 1, wherein the condition is a first condition, and wherein the activating the transceiver is further in response to a determined performance measurement associated with the access point device being determined to satisfy a second condition related to a minimum performance level.

10. A mobile device, comprising:
    a processor; and
    a memory that stores executable instructions that, when executed by the processor, facilitate performance of operations, comprising:
       determining a first location and a corresponding first time for the mobile device;
       determining a second location and a corresponding second time for the mobile device;
       determining a speed and a direction of the mobile device based on the first location, the corresponding first time, the second location, and the corresponding second time;
       determining probable destinations of the mobile device based on the direction and the speed of the mobile device;
       determining probable access point devices based on the probable destinations of the mobile device and access point device information for access point devices comprising the probable access point devices;

in response to overriding a user defined setting of the mobile device, activating, from an off state, a transceiver of the mobile device, wherein the overriding is in response to:
    receiving an instruction altering a load distribution for a network comprising a network device via control of how many mobile devices, comprising the mobile device, access the network device,
    a current location of the mobile device being determined to satisfy a first condition relating to a proximity of an access point device of the probable access point devices to the mobile device,
    a current speed of the mobile device being determined to satisfy a second condition relating to an estimated connection time between the mobile device and the access point device, and
    a data throughput demand value being determined to satisfy a third condition related to offloading data to the access point device; and
directing the transceiver to initiate a connection to the access point device.

11. The mobile device of claim 10, wherein the access point device information comprises an access point device location for an access point device of the access point devices and the determining the probable access point devices comprises access point devices within a defined proximity of a probable destination of the mobile device from the probable destinations of the mobile device.

12. The mobile device of claim 10, wherein the access point device information comprises an access point device performance measurement for an access point device of the access point devices and the activating the transceiver of the mobile device is further in response to the access point device performance measurement being determined to satisfy a fourth condition related to access point device performance.

13. The mobile device of claim 10, wherein the satisfying the second condition is based on determining the estimated connection time based on the speed of the mobile device and a connectivity range of the access point device, and determining that the estimated connection time has transitioned a determined connection time value.

14. The mobile device of claim 10, wherein the satisfying the third condition is based on a ranking of access point devices comprising the probable access point devices.

15. The mobile device of claim 10, wherein the satisfying the third condition is based on the data throughput demand value being determined to have transitioned a determined value indicating election of the access point device relative to a NodeB access point device.

16. A non-transitory machine-readable storage medium, comprising executable instructions that, when executed by a processor, facilitate performance of operations, comprising:
    receiving first location information and second location information associated with a mobile device;
    determining a current trajectory based on the first location information and the second location information;
    determining a probable access point device based on the first location information and the current trajectory;
    initiating a transmission of an instruction related to overriding a power state setting of a transceiver of the mobile device to alter a status of the transceiver of the mobile device from an off state to an active state, wherein the power state setting is based on an input received via the mobile device, wherein the instruction facilitates altering a load distribution among network devices via control of how many mobile devices, comprising the mobile device, are able to access a network device of the network devices, and wherein the initiating the transmission of the instruction is in response to:
    receiving a current location and the current trajectory associated with the mobile device;
    the current location of the mobile device being determined to satisfy a first condition relating to a proximity of the mobile device to the probable access point device,
    the current trajectory of the mobile device being determined to satisfy a second condition relating to a determined connection time between the mobile device and the probable access point device, and
    a data offload value being determined to satisfy a third condition related to a directed election of the probable access point device; and
    enabling data communication to be initiated via the probable access point device.

17. The non-transitory machine-readable storage medium of claim 16, wherein the initiating the transmission of the instruction comprises identifying the probable access point device and wherein the probable access point device is a Wi-Fi access point device.

18. The non-transitory machine-readable storage medium of claim 16, wherein the initiating the transmission of the instruction comprises identifying the probable access point device and wherein the probable access point device is a femtocell access point device.

19. The non-transitory machine-readable storage medium of claim 16, wherein the second condition is determined to be satisfied based on computing an expected connection time based on the current trajectory of the mobile device and a connectivity range of the probable access point device, and determining that the expected connection time exceeds a minimum connection time value.

20. The non-transitory machine-readable storage medium of claim 16, wherein the third condition is determined to be satisfied based on the data offload value being determined to exceed a value indicating a use of the probable access point device relative to a macro level cellular radio device.

\* \* \* \* \*